(12) United States Patent
Abousleman

(10) Patent No.: US 7,020,335 B1
(45) Date of Patent: Mar. 28, 2006

(54) METHODS AND APPARATUS FOR OBJECT RECOGNITION AND COMPRESSION

(75) Inventor: Glen Patrick Abousleman, Scottsdale, AZ (US)

(73) Assignee: General Dynamics Decision Systems, Inc., Scottsdale, AZ (US)

( * ) Notice: Subject to any disclaimer, the term of this patent is extended or adjusted under 35 U.S.C. 154(b) by 499 days.

(21) Appl. No.: 09/717,592

(22) Filed: Nov. 21, 2000

(51) Int. Cl.
*G06K 9/48* (2006.01)

(52) U.S. Cl. .................. 382/199; 382/233; 375/240.11

(58) Field of Classification Search ................ 382/190, 382/192, 194, 195, 199, 203, 205, 209, 218, 382/219, 224, 233, 240, 243; 375/240.08, 375/240.12, 240.13, 240.11
See application file for complete search history.

(56) References Cited

U.S. PATENT DOCUMENTS

| | | | |
|---|---|---|---|
| 4,989,257 A * | 1/1991 | Horowitz | 382/192 |
| 5,710,829 A * | 1/1998 | Chen et al. | 382/173 |
| 6,188,790 B1 * | 2/2001 | Yoshikawa et al. | 382/194 |
| 6,404,814 B1 * | 6/2002 | Apostolopoulos et al. | 375/240.12 |
| 6,650,705 B1 * | 11/2003 | Vetro et al. | 375/240.08 |

* cited by examiner

*Primary Examiner*—Samir Ahmed
(74) *Attorney, Agent, or Firm*—Jenner & Block LLP

(57) ABSTRACT

Apparatus and methods are provided for object recognition and compression. The apparatus (114) comprises an object processor (402) configured to receive the image (120) and synthesize a contour (404) of an object within the image (120) and a classification engine (406) configured to receive the contour (404) of the image (120) and recognize the object within the image as a member of a first object class if the object substantially meets first object criteria of the first object class that is at least partially related to the target-specific utility of the image. The apparatus (114) also comprises a multi-rate encoder (116) configured to compress a first region of the image (120) having said object recognized as said member of said first object class at a first coding rate, said first coding rate providing a first coding resolution of said first region that is greater than a second coding resolution provided by a second coding rate for the image.

22 Claims, 18 Drawing Sheets

METHODS AND APPARATUS FOR OBJECT RECOGNITION AND COMPRESSION

FIELD OF THE INVENTION

The present invention generally relates to image compression, and more particularly to methods and apparatus for recognition of objects in an image and compression of the objects that are recognized in the image such that target-specific utility is maintained for the image.

BACKGROUND OF THE INVENTION

Storage and transmission of digital imagery generally requires a vast amount of raw data. Increased sensor resolution in spatial, temporal, and spectral dimensions further increases the requirements for the transmission of digital imagery, including storage, bandwidth and other transmission requirements. For example, an eight bit 1024-by-1024 pixel image generally requires approximately eight megabits of digital information, a hyperspectral scanner collecting two hundred bands of twelve bit imagery typically produces approximately two and a half gigabits of digital information for one hyperspectral image, and high-resolution twenty-four bit video at thirty frames/second would typically require about seven hundred and fifty megabits/second.

In order to address the digital imagery storage and transmission rate increases, lossy compression techniques have been developed to reduce the overall number of bits for representation of a digital image while adhering to subjective and/or quantitative image fidelity criteria. In other words, selected image information is discarded to reduce the number of bits allotted for representation of the digital image. Examples of lossy compression techniques include JPEG, MPEG variants and H.263.

Lossy compression techniques provide bit reduction in digital image representation, but typically introduce uniform distortion in the image. Generally, as the bit rate is reduced with a lossy compression technique, there is a corresponding degradation in the image quality, including blurriness, fuzziness or other visual artifact, for example.

Lossy compression techniques have also been designed that provide bit reduction with non-uniform distortion in the image. For example, regions of the image having higher energy levels are coded with a greater number of bits as compared to regions with lower energy levels. Alternatively, regions with a greater number of edges are coded with a greater number of bits as compared to regions with fewer edges. This type of region classification can be based upon a variety of metrics in addition to energy levels and edge counts, such as fractal dimension, average gray level, and statistical variance. Although these compression methods can yield improved compression performance for a wide range of imagery, sufficient intelligence is lacking to distinguish between a region for which fidelity is preferably maintained and a region for which fidelity is less important. In other words, sufficient intelligence is lacking to maintain target-specific utility of an image while reducing the transmission requirements for an image.

Accordingly, methods and apparatus are desirable for distinguishing between a region for which fidelity is preferably maintained and a region for which fidelity is less important, such that a video image is compressed with reduced transmission requirements (e.g., bandwidth and/or storage requirements) while preserving the target-specific utility of the video image. Furthermore, additional desirable features, advantages and applications of the present invention will become apparent from the foregoing background of the invention, the subsequent detailed description of a preferred exemplary embodiment and the appended claims, taken in conjunction with the accompanying drawings.

BRIEF DESCRIPTION OF THE DRAWINGS

The present invention will hereinafter be described in conjunction with the following drawing figures, wherein like numerals denote like elements, and.

DETAILED DESCRIPTION OF A PREFERRED EXEMPLARY EMBODIMENT

The following detailed description of a preferred exemplary embodiment is merely exemplary in nature and is not intended to limit the invention or the application and use of the invention.

Figure 1:
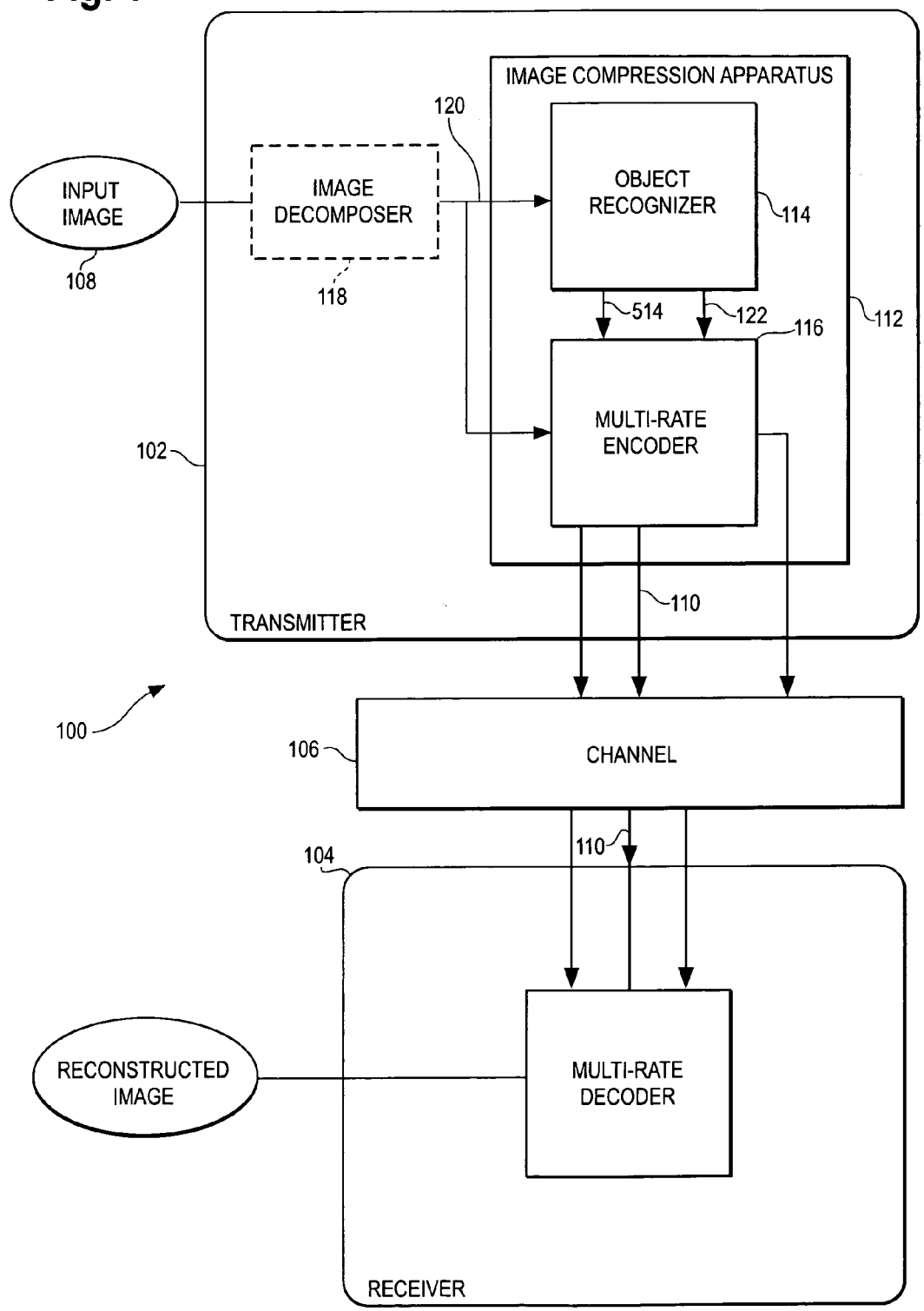
FIG. 1 is an image communication system according to a preferred exemplary embodiment of the present invention.

FIG. 1 illustrates an image communication system 100 in accordance with a preferred exemplary embodiment of the present invention. The image communication system 100 includes, but is not limited to, a transmitter 102, a receiver 104 and a channel 106. The transmitter 102 receives an input image 108, recognizes an object within the input image 108 as a member of an object class if the object meets object criteria of the object class, and compresses a region of the image having the object at a first coding rate that is greater than a second coding of the transmitter 102 such that a compressed image 110 is transmitted through the channel 110 with reduced bandwidth and/or storage requirements while preserving the target-specific utility in the input image 108. In other words, at least one requirement for transmission of the image is reduced while fidelity is maintained for a region or multiple regions of the image that are of particular interest to the image communication system 100.

The input image 108 can be any number of image data types. For example, the input image 108 can be panchromatic, color, hyper-spectral, video, or stereo image data types. The input image 108 is preferably provided to an image decomposer 118 for decomposition of each component of the input image 108 into multiple subbands 120, and most preferably into multiple discrete subbands.

Figure 2:
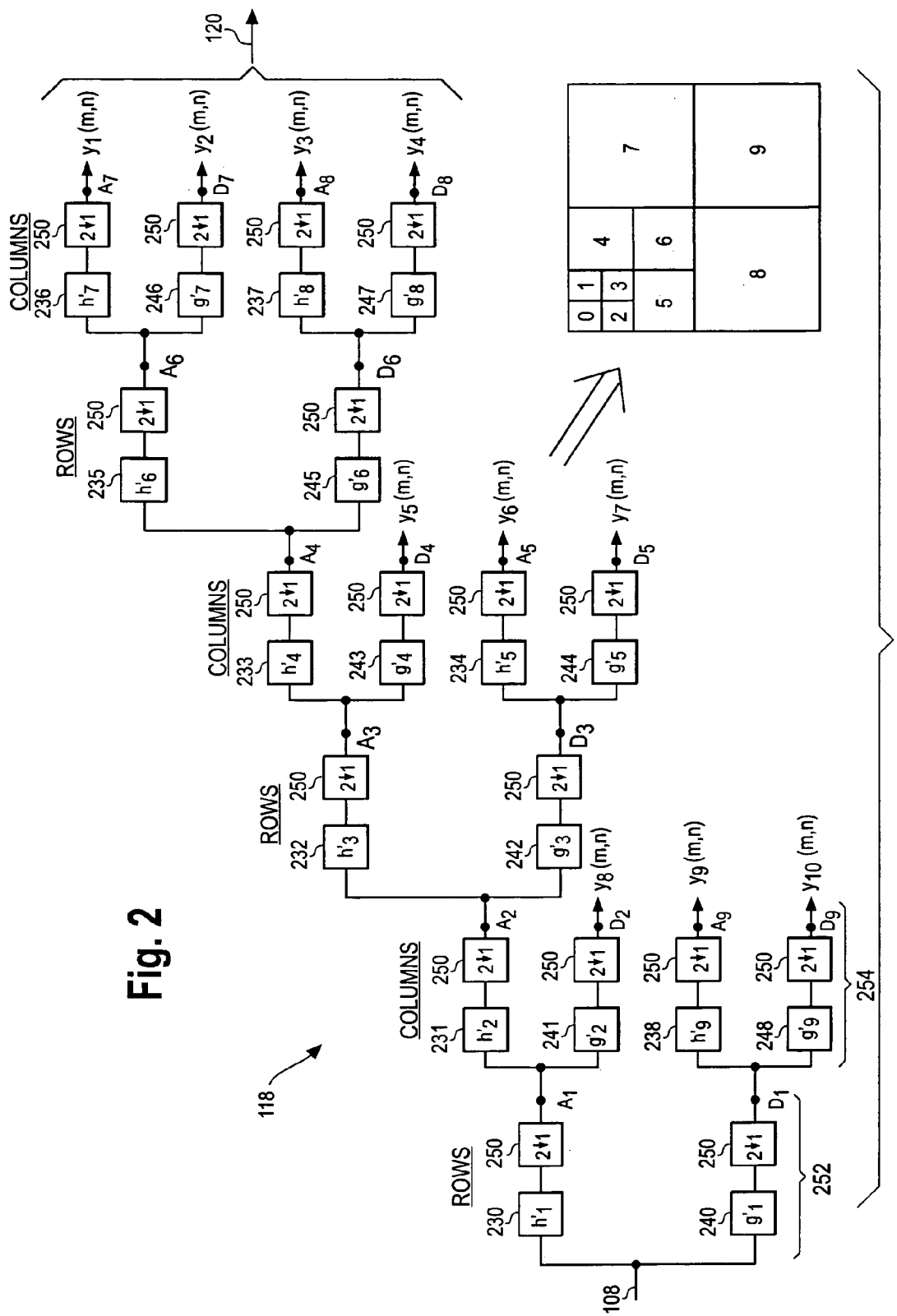
FIG. 2 is the image decomposer of FIG. 1 in greater detail according to a preferred exemplary embodiment of the present invention.
Figure 3:
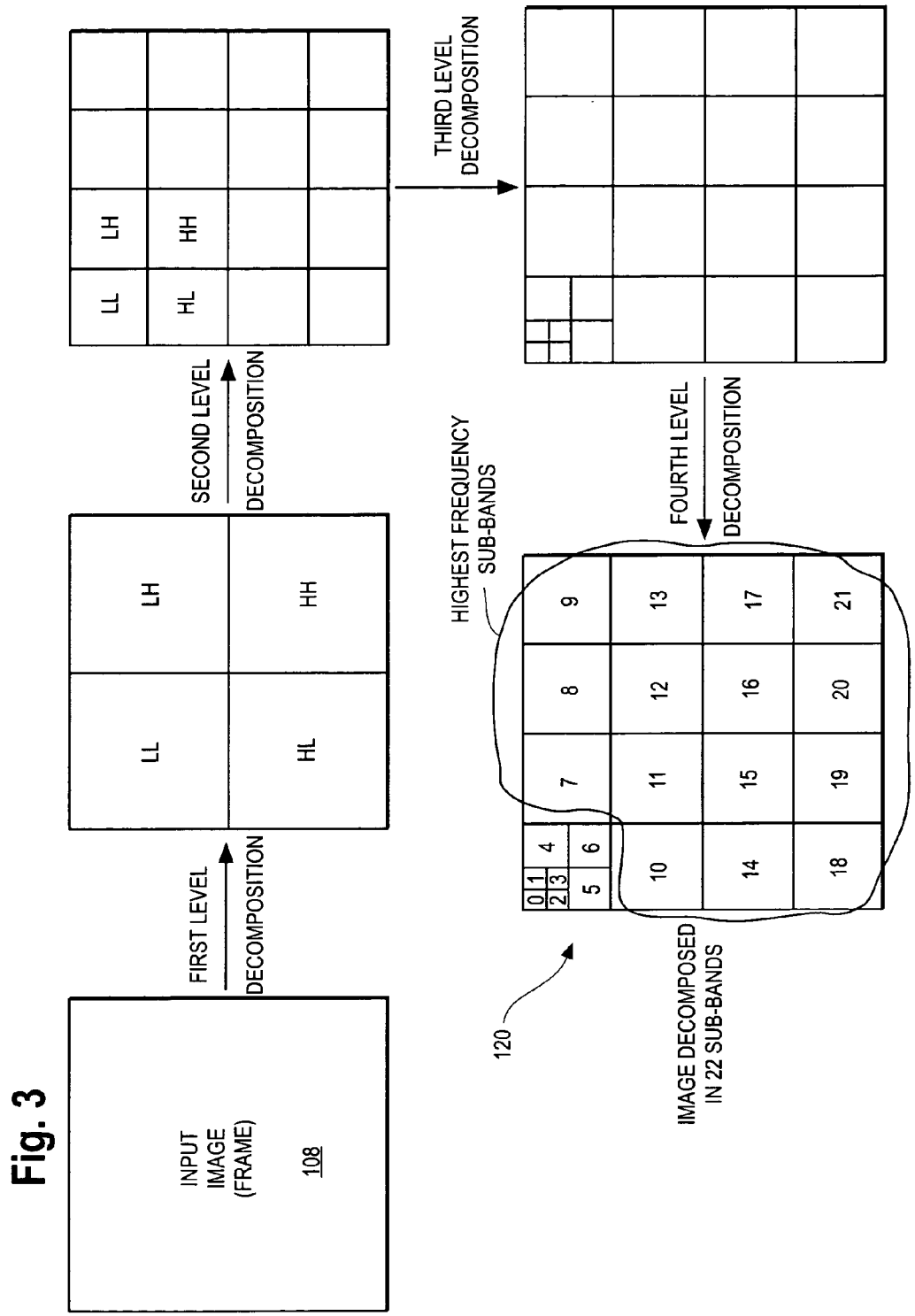
FIG. 3 is an illustration of twenty-two discrete subband decomposition according to a preferred exemplary embodiment of the present invention.

Referring to FIG. 2, the image decomposer 118 is shown in greater detail, which can utilize any number of transformation techniques, such as wavelet decomposition, Fourier transformation or discrete cosine transformation, for example. In a preferred exemplary embodiment of the present invention, the image decomposer 118 uses a two-dimensional (2-D) discrete wavelet transform (DWT) to perform a four level decomposition of each component of the input image 108 into about twenty-two discrete subbands using a modified Mallat tree configuration, with one additional level of decomposition preferably performed on the highest-frequency components following the first level of decomposition. For example, the image decomposer 118 can use a 2-D DWT to perform a four level decomposition of each luminance and/or color component of the input image 108 into about twenty-two discrete subbands using a modified Mallat tree configuration, with at least one additional level of decomposition preferably performed on the highest-frequency components following the first level of decomposition. Furthermore, while the image decomposer 118 shown in FIG. 2 is configured to perform a 2-D DWT decomposition of any component of the input image 108 into about ten discrete subbands, the image decomposer 118 can be configured for any number of subband decompositions, including the twenty-two discrete subband decomposition shown in FIG. 3.

With continued reference to FIG. 2, the image decomposer 118 includes a plurality of low pass filters 230–238 and a plurality of high pass filters 240–248 for performing spectral decomposition of the input image 108. In a preferred exemplary embodiment, the low and high pass filters 230–238 are implemented as finite impulse response (FIR) filters. The image decomposer 118 also includes a plurality of down samplers 250 for reducing the overall number of samples that describe the contents of each discrete subband. In a preferred embodiment, two-to-one down samplers 250 are used to remove and discard alternating bits from the sequence output of each high-pass and low-pass filter, therefore the down sampling ratio of the down samplers 250 will be application specific.

Each stage of the image decomposer 118 divides the input image 108 into a course approximation signal ($A_m$) and a detail signal ($D_m$). The course approximation signal ($A_m$) and the detail signal ($D_m$) can then be further divided into further approximation and detail signals (e.g., $A_{m+1}$ and $D_{m+1}$). This filtering scheme facilitates the performance of row/column splitting. A row/column split effectively filters the input image 108 of dimension M rows by N columns along the rows and columns to produce four subbands, each of dimension M/2 rows by N/2 columns.

More specifically, in the first stage 252 of the image decomposer 118, each row of length N is convolved with the impulse response ($h_1'$) of the first low pass filter 230 to produce a first filtered output sequence which is also of length N. The first filtered output sequence is then decimated by a factor of two in the corresponding two-to-one down sampler 250 to produce a first decimated output sequence of length N/2. Also in the first stage 252 of the image decomposer 118, each row of length N is convolved with the impulse response ($g_1'$) of the first high pass filter 240 to produce a second filtered output sequence of length N. The second filtered output sequence is decimated in the corresponding two-to-one down sampler 250 to produce a second decimated output sequence of length N/2. The first decimated output sequence for the rows of the input image 108 are collected into a first new 2-D signal ($A_1$) of dimensional M rows by N/2 columns. Similarly, the second decimated output sequences for the rows of the input image 112 are collected into a second new 2-D signal ($D_1$) of dimension M rows by N/2 columns.

In the second stage 254 of the image decomposer 118, each column of the first new 2-D signal ($A_1$) is convolved with the impulse response ($h_2'$) of low pass filter 231 to produce a third filtered output sequence of length M. The sequence is decimated in the corresponding two-to-one down sampler 250 to create a third decimated output sequence of length M/2. In the second stage 254, each column of the first new 2-D signal ($A_1$) is convolved with the impulse response ($g_2'$) of high pass filter 241 to create a fourth filtered output sequence of length M. The fourth filtered output sequence is then decimated to produce a fourth decimated output sequence of length M/2.

The third decimated output sequence for all of the columns of the first new 2-D signal ($A_1$) are then collected into a third new 2-D signal ($A_2$) of dimension M/2 rows by N/2 columns. Similarly, the fourth decimated output sequences for all of the columns of the first new 2-D signal ($A_1$) are collected into a fourth new 2-D signal ($D_2$) of dimension M/2 rows by N/2 columns. A similar procedure is then performed for the second new 2-D signal signal ($D_1$) to complete the row/column split. Additional row/column splits can then be performed to further divide the input image 108 into the desired number of multiple subbands 120 (i.e., $y_1(m,n)$–$y_s(m,n)$), which are provided to the object recognizer 114 and multi-rate encoder 116 of the image compression apparatus 112 (FIG. 1) for object recognition and compression, respectively.

Figure 4:
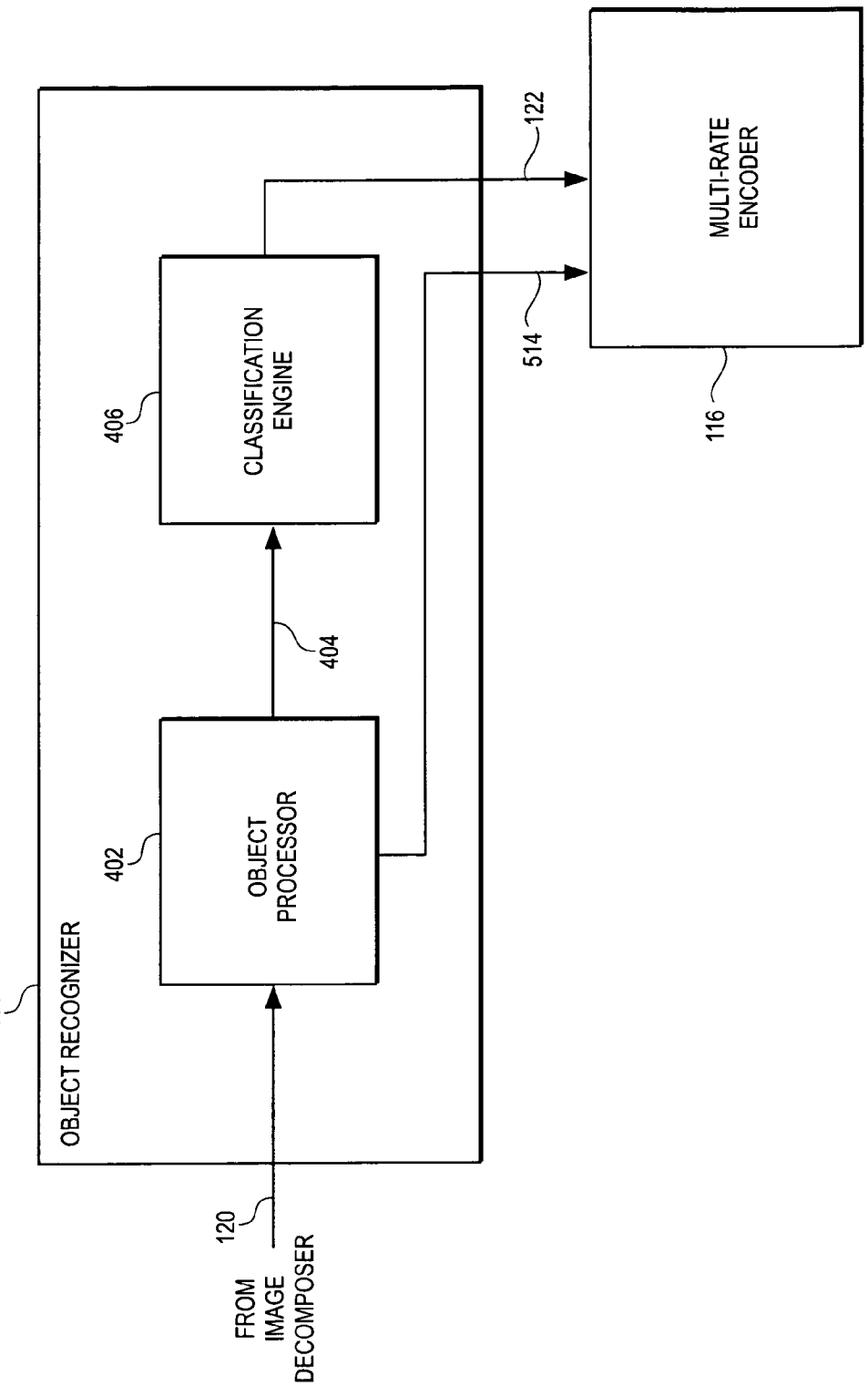
FIG. 4 is the object recognizer of FIG. 1 in greater detail according to a preferred exemplary embodiment of the present invention.

Referring to FIG. 4, the object recognizer 114 is shown in greater detail, which is configured to recognize at least one object within the image as a member of an object class if the object substantially meets object criteria of the object class. As can be appreciated, object contours and object edges represent visual features that are useful for characterizing and perceiving the shape of objects. Furthermore, numerous object types can be recognized with an object contour analysis. Therefore, the object processor 402 configured to synthesize object contours and produce a symmetrically rotated binary image chip 404 of an object within the input image for subsequent recognition procedures.

The symmetrically rotated binary image chip 404 that is produced by the object processor 402 is provided to a classification engine 406 for recognition of an object or objects that are members of one or more object classes. The classification engine 406 is preferably configured to recognize an object as a member of an object class if the object substantially meets object criteria of the object class. For example, the classification engine can be configured to recognize a land, sea and/or air vehicle (e.g., tank, military aircraft, battleship) as a member of an object class of relevant objects (i.e., a relevant object class) based upon object criteria such as shape, size, texture, mean, variance, and moments, and configured to ignore an object that does not meet the object criteria of the object class (i.e., recognize the object as a member of an object class of non-relevant objects), that can include the background of an image. In addition, the classification engine 406 can be configured to recognize multiple object classes.

The multi-rate encoder 116 is preferably configured to provide at least a first-resolution compression of an object recognized by the classification engine 406 as a member of an object class and a second-resolution compression that is less than the first-resolution compression of an object that is not recognized by the classification engine 406 as a member of an object class (i.e., a non-relevant object, which can include the background of the image) such that image fidelity is maintained for objects that are members of an object class while the input image is compressed with reduced transmission requirements (e.g., bandwidth and/or storage requirements). However, the multi-rate encoder 116 can be configured to provide any number of compression rates for a particular image resolution that is associated with an object class recognized by the classification engine 406.

Figure 5:
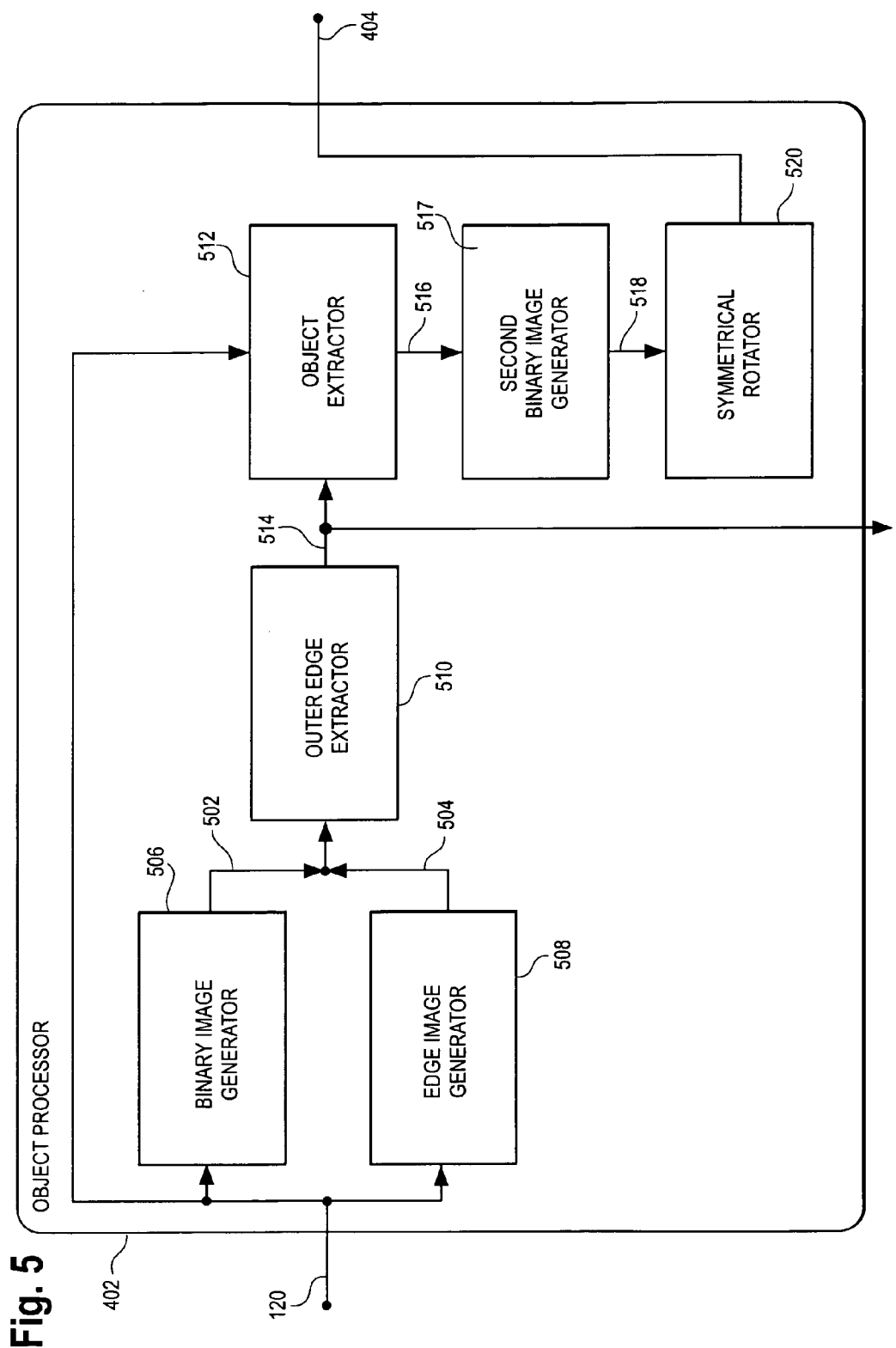
FIG. 5 is the object processor of FIG. 4 in greater detail according to a preferred exemplary embodiment of the present invention.

Referring to FIG. 5, the object processor 402 is shown in greater detail. The object processor 402 is preferably configured to generate a symmetrically rotated binary image chip 404 from the multiple subbands 120. Alternatively, the object processor 402 can be configured to generate a symmetrically rotated binary image chip 404 from the multiple subbands 120 of a zero-level decomposition (i.e., an input image that is not decomposed into multiple subbands). Therefore, the multiple subbands can be a zero-level deposition of the input image or any n-level decomposition of the input image.

The object processor 402 begins the generation of the symmetrically rotated binary image chip 404 with the production of a binary image 502 and/or edge image 504 using a binary image generator 506 and/or an edge image generator 508, respectively. The object processor 402 can utilize the binary image generator 506 or edge image generator 508 independently or in combination to produce the binary image 502 or the edge image 504 of the multiple subbands 120.

Figure 6:
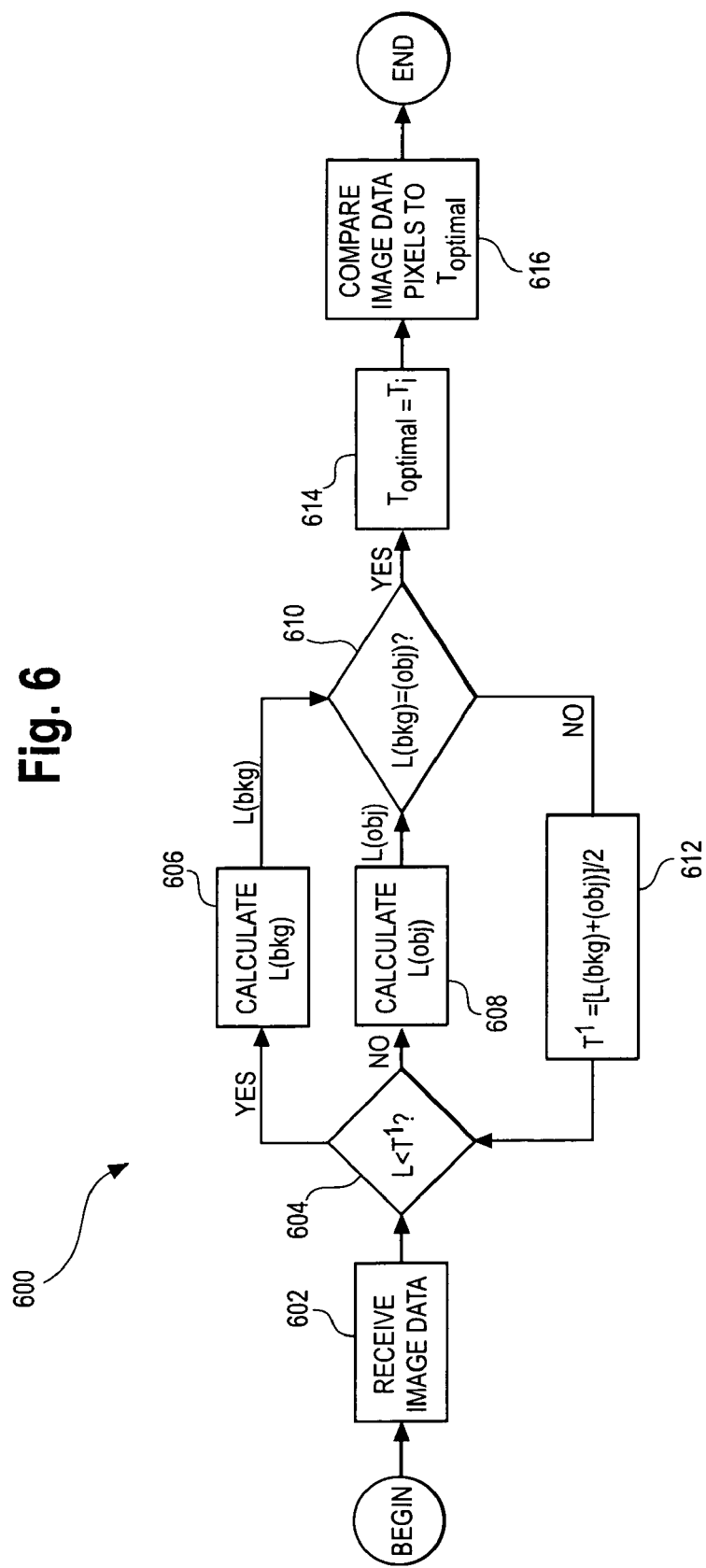
FIG. 6 is a flowchart illustrating a method of determining a binary image according to a preferred exemplary embodiment of the present invention.

The binary image generator 402 can be configured to produce the binary image 502 using any number of techniques, including the method of determining a binary image 600 that is illustrated in FIG. 6. Generally, identifying an optimal threshold and comparing each pixel of the multiple subbands 120 to the optimal threshold determine the binary image. Pixels greater than or equal to the optimal threshold are assigned a first binary value (e.g., a binary "1") and pixels less than the optimal threshold are assigned a second binary value (e.g., a binary "0").

More specifically, and with reference to FIG. 6, the method of determining the binary image 600 begins by receiving the multiple subbands of the image data or transformed data (L) 602 and also begins with the assumption that the outer edges (e.g., corners) of the image contain background of the image. The transformed data (L) is initially compared to an intermediate integer threshold ($T_i$) 604 and substantially all pixels of the transformed data (L) that are greater than or equal to the intermediate integer threshold ($T_i$) are used to calculate an integer gray level of the background (L(bkg)) 606, while substantially all pixels of the transformed data (L) that are less than the intermediate integer threshold ($T_i$) are used to calculate an integer gray level of the object (L(obj)) 608.

The integer gray level of the object (L(obj)) is compared to the integer gray level of the background (L(bkg)) 610, and a new intermediate integer threshold ($T_i$) is calculated 612 if the integer gray level of the background (L(bkg)) is not equal to the integer gray level of the object (L(obj)) (e.g., $T_i=((L(bkg)+L(obj))/2)$). However, if the integer gray level of the background (L(bkg)) is equal to the integer gray level of the object (L (obj)), the optimal threshold ($T_{threshold}$) is set to the intermediate integer threshold ($T_i$) and the image data is compared to the optimal threshold 616 for formation of a binary image, with the object having the first binary value and the background having the second binary value.

Figure 7:
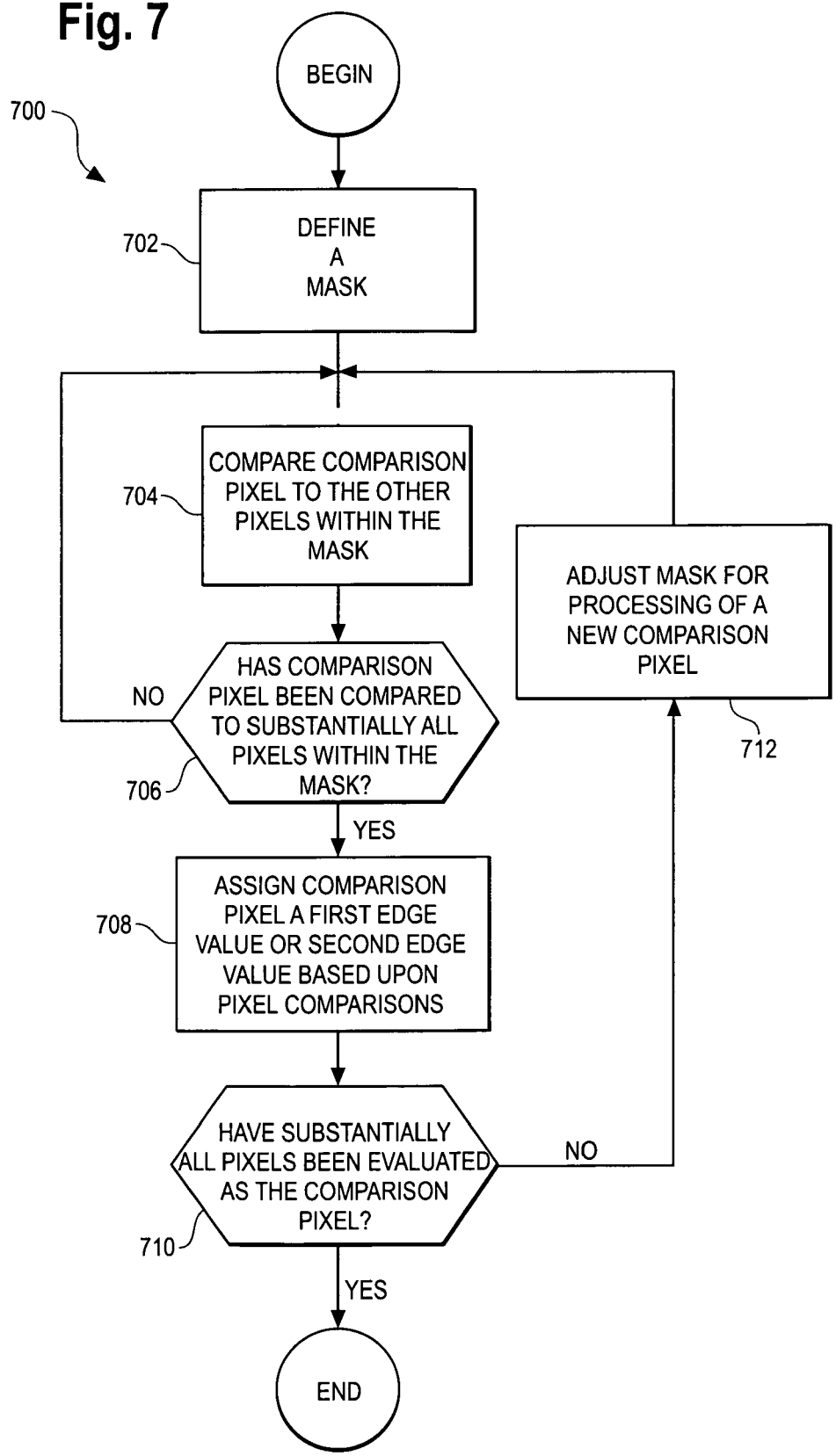
FIG. 7 is a flowchart illustrating a method of identifying the edges of an object according to a preferred exemplary embodiment of the present invention.

Alternatively, or in conjunction with the formation of a binary image of an object by the binary image generator 506, the edge image generator 508 can be configured to form the edge image 504 from the multiple subbands 120 (FIG. 5). Referring to FIG. 7, a method of identifying the edges of an object 700 is shown as preferably implemented by the edge image generator 508 of FIG. 5. However, any number of edge identification techniques and edge image generation methods are suitable for the present invention, including Sobel and Prewitt filtering methods.

Initially, the method of identifying the edges of an object 700 defines a mask 702. The mask can have numerous shapes and dimensions, including, but not limited to, rectangular or circular shapes with N-by-N rectangular dimensions or a predetermined circular diameter, respectively. Once the mask is defined 702, a comparison pixel at a predetermined location within the mask is compared to another pixel within the mask 704. For example, a pixel within the mask can be compared to the comparison pixel that is selected to be at or near the center of the mask, and the comparison between these two pixels can be based upon the pixel brightness. More specifically, the comparison 704 can be based upon a similarity comparison of the comparison pixel brightness and the brightness of the other pixel within the mask, and the comparison pixel can be identified as similar to the other pixel within the mask if the brightness between the comparison pixel and other pixel within the mask is within a predetermined comparison range of brightness (e.g., the comparison pixel is identified as similar to the other pixel within the mask if the brightness of the comparison pixel is within about ten to twenty gray levels of the other pixel).

Once the comparison between the comparison pixel and the other pixel 704 is performed, a query is made to determine whether the comparison pixel has been compared to substantially all the pixels within the mask 706, and once substantially all of the pixels within the mask have been compared to the comparison pixel, the comparison pixel is assigned a first edge value (e.g., a binary "1") or a second edge value (e.g., a binary "0") 708, otherwise the process is repeated and another pixel within the mask is compared to the comparison pixel 704. The comparison pixel is preferably assigned a first edge value or a second edge value 708 based upon the similarity comparisons with the other pixels within the mask.

For example, according to a preferred exemplary embodiment of the present invention, the comparison pixel is assigned the first edge value if the comparison pixel is not within the predetermined comparison range for a predetermined percentage of the other pixels within the mask (e.g., the comparison pixel is assigned the first edge value if the comparison pixel is within the predetermined comparison range for less than seventy-five percent of the other pixels within the mask). Conversely, the comparison pixel is assigned the second edge value if the criteria for the first edge value are not met.

Once a determination is made that the comparison pixel has been compared to substantially all pixels within the mask 706, and the comparison pixel within a mask is assigned a first edge value or a second edge value based upon the other pixel comparisons 708, a query is made to determine whether substantially all of the pixels of the multiple subbands has been evaluated as the comparison pixel 710. If substantially all the pixels of the multiple subbands have not been evaluated as the comparison pixel, the mask is adjusted for a new comparison pixel 712, otherwise the method 700 is complete 714 and an edge image is available for further processing by the outer edge extractor 510 of FIG. 5, with the pixels having either the first edge value or the second edge value defining the edges of the object.

Figure 8:
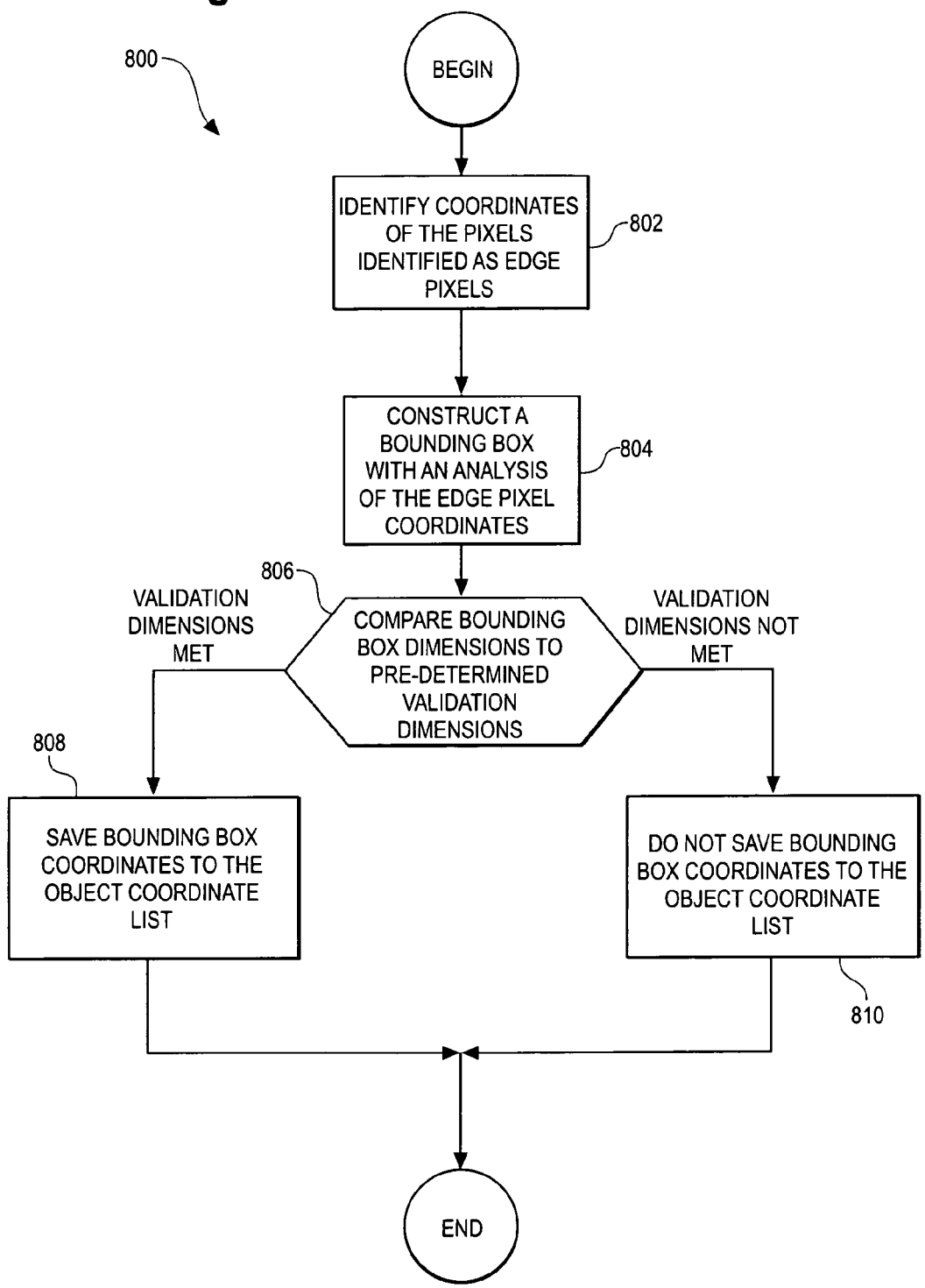
FIG. 8 is a flowchart illustrating a method of extracting an outer edge of an object according to a preferred exemplary embodiment of the present invention.

Referring to FIG. 8, the method of extracting an outer edge of an object 800 is shown that is preferably implemented by the outer edge extractor 510 of FIG. 5. The method of extracting an outer edge of an object 800 is preferably performed on the binary image and/or the edge image in order to produce a coordinate list specifying a bounding region enclosing an object within the input image for one or both of these images. Initially, the method 800 begins with a coordinate identification of the edge pixels of an object 802.

The coordinate identification of the edge pixels of an object 802 is preferably conducted in order to facilitate extraction of an object from the input image, and can be accomplished with any number of methods. For example, the binary image and/or the edge image, which contains two pixel types that will be white and black pixels for illustrative purposes, are scanned for one of the pixel types, and in this illustration the scan is conducted for a first white pixel. Once the first white pixel is located, the coordinates for the first white pixel are recorded and the pixels adjacent to the first white pixel (e.g., the eight-connected pixels surrounding a pixel in a rectangular pixel configuration) are evaluated to locate a second white pixel. The second white pixel is the first adjacent pixel encountered when scanning the pixels adjacent to the first white pixel in a clockwise fashion, starting with the next clockwise position from the direction entering the first white pixel. However, as can be appreciated, the scan can be conducted in a counter-clockwise fashion. The second white pixel encountered when scanning the pixels adjacent to the first while pixel in a clockwise fashion is recorded and a third white pixel is identified from the pixels adjacent to the second white pixel with the clockwise evaluation, starting with the next clockwise position from the position of the second white pixel, relative to the third white pixel. For example, and with the points of a compass as references, if the first white pixel is encountered with a search from east to west, the eight-connected neighbors to the first white pixel are searched in a clockwise fashion, starting with the neighbor to the northwest of the first white pixel, until a white pixel is encountered in this clockwise search (i.e., the second white pixel). If the second white pixel is the neighbor to the northeast of the first white pixel, then the search for the third white pixel would begin with the neighbor to the west of the second white pixel, since this is the next clockwise position from the position of the second white pixel, relative to the third white pixel. This continues until the first white pixel is encountered a second time in this searching process. Once the coordinates of the edge pixels have been identified and recorded, a bounding region is preferably constructed for the object with an analyses of the edge coordinates 804.

Figure 9:
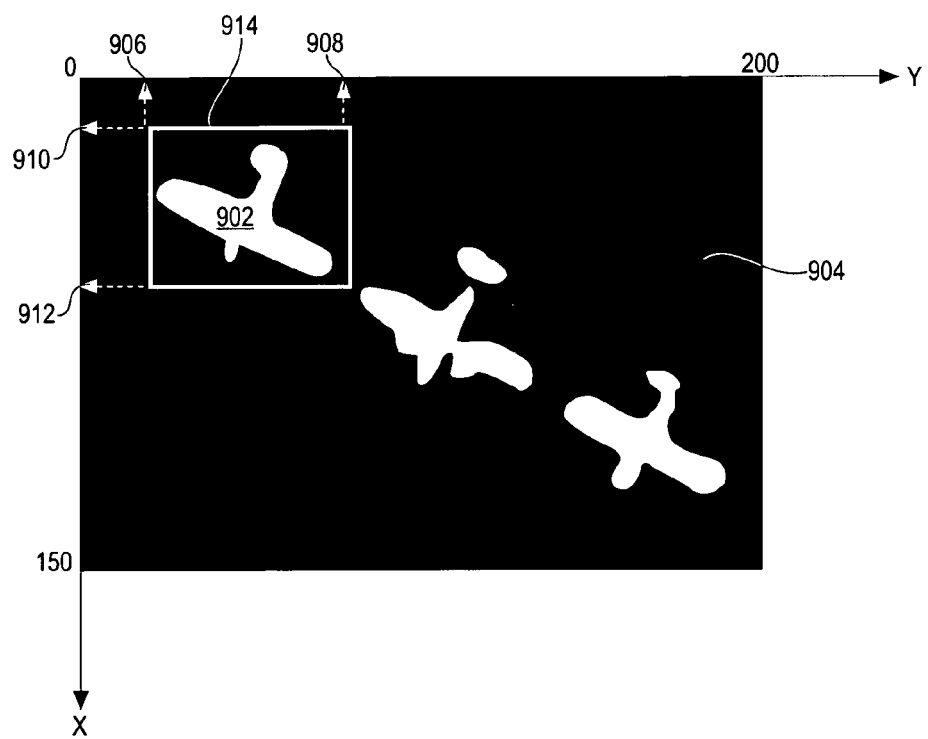
FIG. 9 is a bounding region having an object according to a preferred exemplary embodiment of the present invention.

For example and with reference to FIG. 9, for an object 902 within the binary image 904, the coordinates of the edge pixels of the object 902 are compared and the minimum column coordinate for an edge (min(y-coordinate edge)) 906, maximum column coordinate for an edge (max(y-coordinate edge)) 908, minimum row coordinate for an edge (min(x-coordinate edge)) 910 and maximum row coordinate for an edge (max(x-coordinate edge)) 912 are identified from the coordinate comparison. The bounding box 914 is then constructed with the minimum column 906, maximum column 908, minimum row 910 and maximum row 912 designating the vertices of the bounding box 914 (i.e., bounding box corners at (minimum column 906, minimum row 910), (minimum row 910, maximum column 908), (maximum row 912, minimum column 906, maximum row 912, maximum column 908)). While a bounding box 914 is utilized in this preferred exemplary embodiment of the present invention, any number of geometrical shapes can be used to form a bounding region of an object, including, but not limited to, circles, ellipses, triangles, pentagons, and hexagons. Once the bounding box 914 or other suitable bounding region is constructed, the method 800 of FIG. 8 continues with an object validation.

More specifically and with reference to FIG. 8, the dimensions of the bounding box are compared to predetermined validation dimensions 806 that can include both minimum validation dimensions and/or maximum validation dimensions. If the dimensions of the bounding box for an object meet the predetermined validation dimensions, the object is considered to be a valid object, and the bounding box coordinates of the object are saved to an object coordinate list 808. However, if the dimensions of a bounding box for an object do not meet the predetermined validation dimensions, the object is considered to be an invalid object, and the bounding box coordinates of the object are not saved to the object coordinate list 810 for extraction of an object from the multiple subbands.

Referring to FIG. 5, the object extractor 512 is configured to receive the object coordinate list 514 and the multiple subbands 120. The object extractor 512 extracts pieces of the original subbands, i.e., image chips 516 corresponding to the regions within the input image specified by the coordinate list 514. After the image chips 516 are extracted from the multiple subbands 120 of the input image, a binary representation of each image chip 516 is generated with a second binary image generator 517, which can use any number of techniques, including the method of determining a binary image 600 as illustrated in FIG. 6. The object within a binary image chip 518 generated by the second binary image generator 517 is rotated to conform to a symmetrical axis with a symmetrical rotator 520, and in a preferred embodiment, rotated to conform to a vertical symmetry axis. The object is rotated so as to conform to a standard configuration for the classifier. That is, the classifier is trained with the objects oriented in a particular direction. To facilitate robust classification performance, all objects are oriented in the same direction as the training objects.

Figure 10:
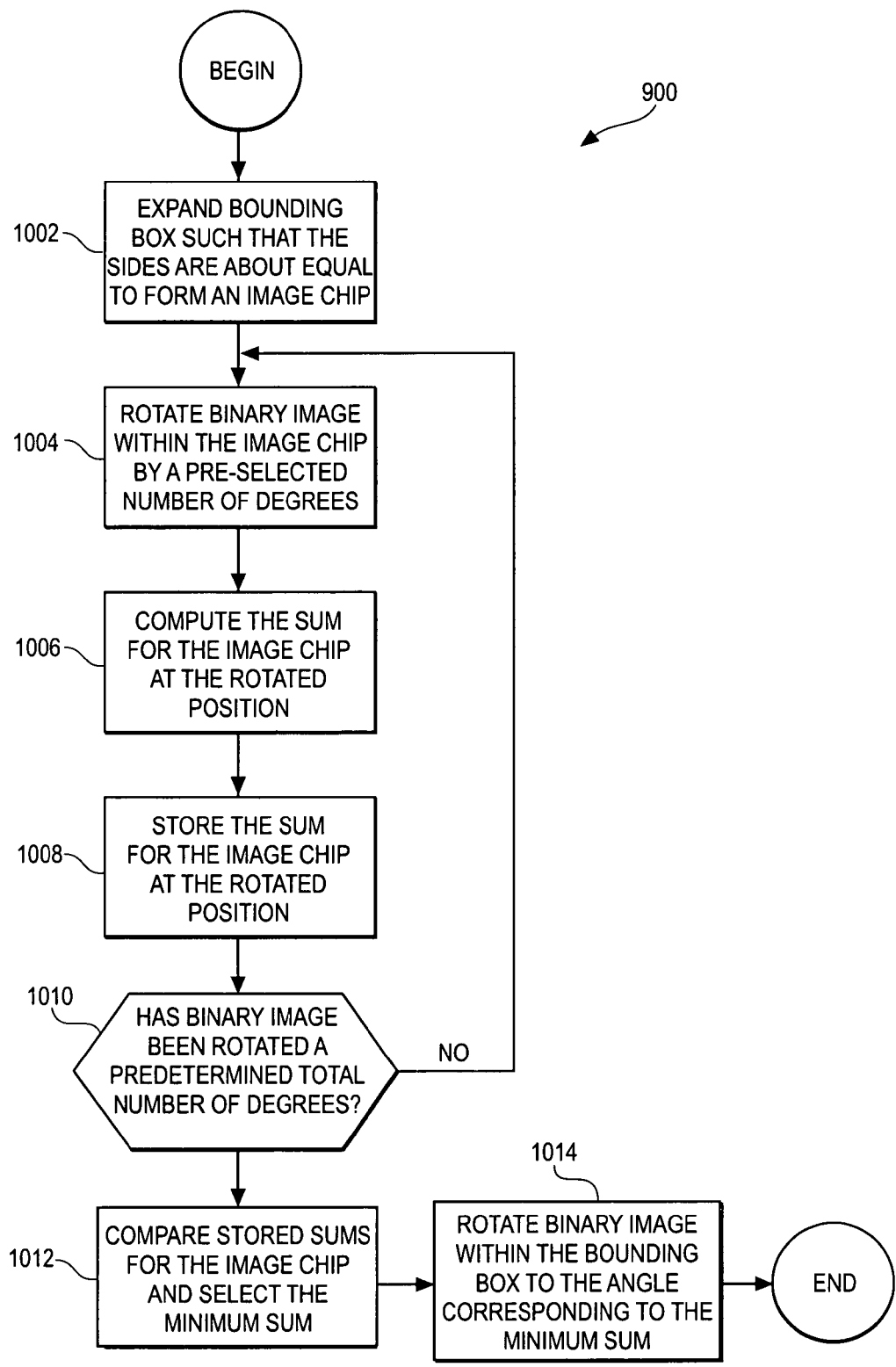
FIG. 10 is a flowchart illustrating a method for providing a symmetrical rotation of a binary image about a vertical axis according to a preferred exemplary embodiment of the present invention.

The symmetrical rotator 520 can use numerous techniques to conform the binary image chip 518 to a symmetrical axis, which is preferably a vertically symmetrical axis. In a preferred embodiment of the present invention, one of the following methods for providing symmetrical rotation about a vertical axis is utilized by the symmetrical rotator 520. Referring to FIG. 10, a method for providing a symmetrical rotation of a binary image about a vertical axis 1000 is illustrated according to a first preferred embodiment of the present invention.

Initially, dimensions of the image chip are expanded such that the image chip has a substantially symmetrical shape. For example, the previously described bounding box, specifying the region within the input image having an object, is expanded such that the bounding box is substantially square (i.e., each of the sides of the rectangular region forming the bounding box are about equal in length) 1002. This results in a symmetrically shaped image chip (I(i,j)) that preferably contains a single object, which is padded to form the desired symmetrical shape.

After the dimensions of the image chip are expanded to form the symmetrically shaped image chip (I(i,j)) 1002, the object within the symmetrically shaped image chip is rotated by a pre-selected number of degrees in a clockwise or counterclockwise manner 1004. Preferably the object is rotated counterclockwise and most preferably counterclockwise by about three degrees (3°). Once the rotation is completed, a sum for the symmetrically shaped image chip (sum(I)) is computed at the rotated position 1006 according to the following:

$$sum(I) = \sum_{i=0}^{N-1} \left| \sum_{j=0}^{N-1} \left(j - \frac{N}{2}\right) I(i,j) \right| \quad (1)$$

The sum for the symmetrically shaped image chip (sum(I)) at the rotated position is stored 1008 and a query is made to determine whether the object has been rotated a predetermined total number of degrees 1010, which is preferably about one hundred and eighty degrees. If the object has not been rotated the predetermined total number of degrees, the object is rotated 1004 and a sum for the symmetrically shaped image chip (sum(I)) is computed at the rotated position 1006 and stored 1008 until the object has been rotated the predetermined total number of degrees. Once the object has been rotated the predetermined total number of degrees, the sum for the symmetrically shaped image chip (sum(I)) at each rotated position is compared and the angle at the rotated position with the minimum sum is selected 1012 and the object is rotated to this angle 1014. Alternatively, the method for providing a symmetrical rotation of a binary image about a vertical axis 1100 that is illustrated in FIG. 11 can be utilized according to a second preferred embodiment of the present invention.

Figure 11:
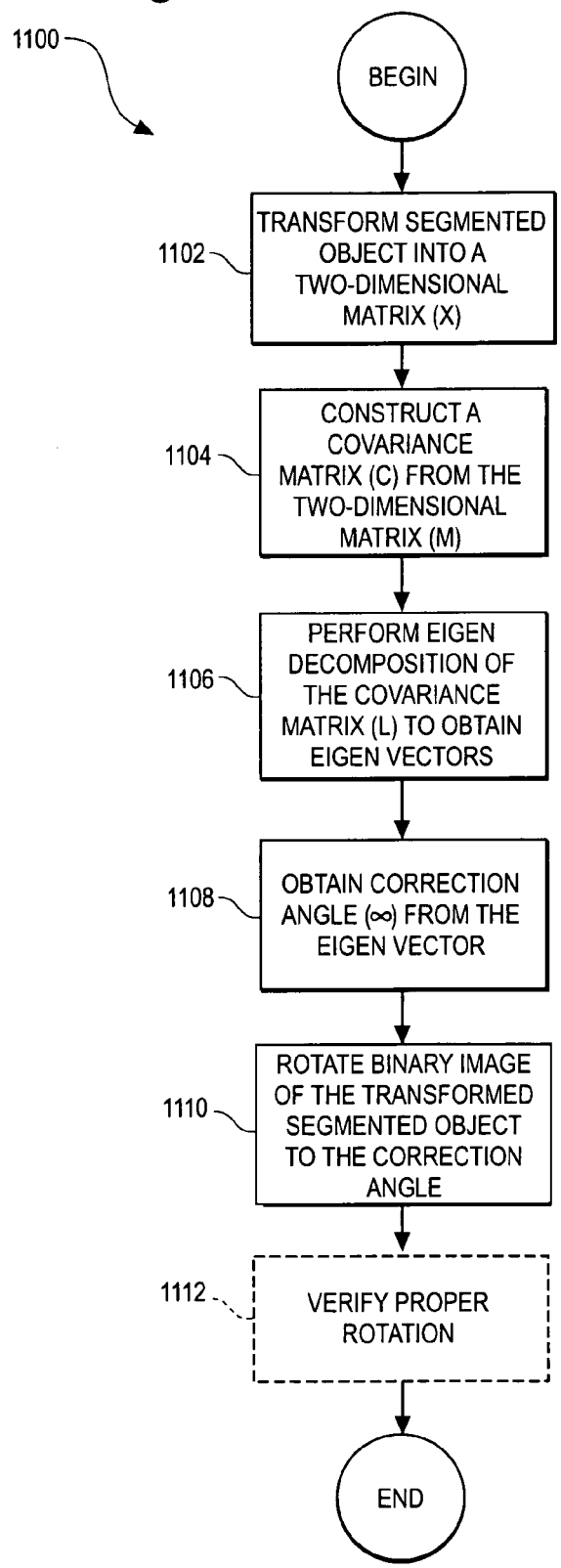
FIG. 11 is a flowchart illustrating an alternate method for providing a symmetrical rotation of a binary image about a vertical axis according to a preferred exemplary embodiment of the present invention.

Referring to FIG. 11, the binary image chip is transformed into a two-dimensional matrix (X) having N rows and two columns 1102, where each row consists of the row and column location of each object pixel within the binary image chip. A covariance matrix (C) is constructed from the two-dimensional matrix (X) 1104 as follows:

$$C = 1/N[(X-\mu_x)^T(X-\mu_x)] \quad (2)$$

Where $\mu_x$ is the mean of X (i.e., $$\mu_X = \frac{1}{2N} \sum_{i=1}^{2} \sum_{j=1}^{N} x_{ij} \right).$$

An Eigendecomposition is performed on the covariance matrix (C) to obtain the eigenvectors (V=[$v_1$ $v_2$]) 1106 as follows:

$$C = V^T U V \quad (3)$$

Where $$v_1 = \begin{bmatrix} v_{11} \\ v_{12} \end{bmatrix},$$

the Eigenvalues (U)

$$(U) = \begin{bmatrix} u_1 & 0 \\ 0 & u_2 \end{bmatrix},$$

$u_1$ is the Eigenvalue associated with eigenvector $v_1$, $u_2$ is the Eigenvalue associated with eigenvector $v_2$, and $|u_1|>|u_2|$. Once the Eigenvectors (V=[$v_1$ $v_2$]) are obtained, a correction angle ($\alpha$) is obtained 1108 as follows:

$$\alpha = a\tan(v_{12}/v_{11}) \quad (4)$$

The object is rotated to the correction angle ($\alpha$) and substantially all excess rows and columns are removed from the bounding box such that the sides of the bounding box touch the object 1110. This produces an object that is effectively centered within the rectangular region defined by the bounding box.

Preferably, the proper rotation is verified 1112 with the projection of the columns onto a horizontal axis and summing along each column in the object matrix. If sums are symmetric about the center of a horizontal axis of the binary image chip, the object has been properly rotated and further rotation is unnecessary. However, if the sums to the left of the horizontal axis are greater than the sums to the right of the horizontal axis, the object is preferably rotated by an additional correction angle of ninety degrees (90°). If the sums to the right side of the horizontal axis are greater than the sums to the left of the horizontal axis, the object is preferably rotated by an additional correction angle of negative ninety degrees (−90°).

Following rotation of the object within the binary image chip, the rotated objects is preferably scaled such that the longest dimension of the object is a predetermine size and the aspect ratio is retained for the object (i.e., the ratio of the longest dimension to the shortest dimension is preserved for the object). For example, the object can be scaled such that the longest dimension is about forty-eight pixels, although other sizes can be used in accordance with the invention. Once the longest dimension of the object is scaled to the predetermined size (e.g., forty-eight pixels), background padding is added to form a rectangular image having sides that are substantially equal (e.g., the image chip is forty-eight by forty-eight pixels). Once the longest dimension of the object is scaled to the predetermined size and padded to form the symmetrically rotated binary image chip 404, the symmetrically rotated binary image chip 404 is provided to the classification engine 406 as shown FIG. 12.

Figure 12:
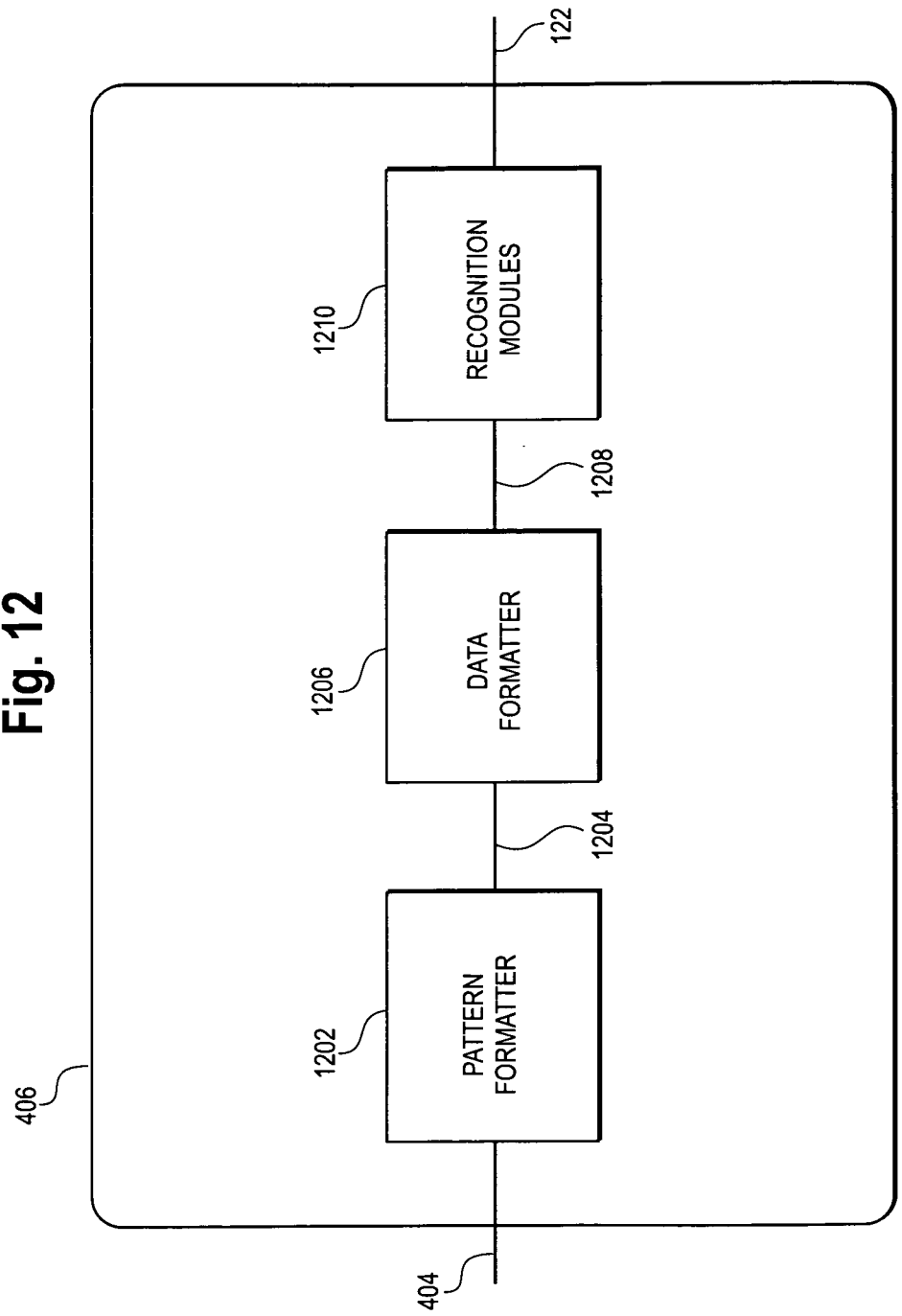
FIG. 12 is the classification engine of FIG. 4 in greater detail according to a preferred exemplary embodiment of the present invention.

Referring to FIG. 12, the classification engine 406 is preferably configured to receive the symmetrically rotated binary image chip 404 and initially convert the symmetrically rotated binary image chip 404 to a desirable pattern output 1204. For example, the classification engine 406 can be configured to receive the symmetrically rotated binary image chip 404 with a pattern formatter 1202 that converts the symmetrically rotated binary image chip 404 to a desirable grayscale, binary representation, or any other number of contour parameters. This patterned output 1204 is also preferably converted to a desirable data format with a data formatter 1206. For example, the data formatter 1206 can subsequently convert the patterned output 1204 to a data formatted output 1208 such as a topology dependent vector. The data formatted output 1208 is provided to recognition modules 1210 that are preferably assembled for determining whether or not an object is a member of an object class. This recognition of an object as a member of an object class is preferably accomplished with an evaluation of a class confidence output of the recognition modules 1210.

Figure 13:
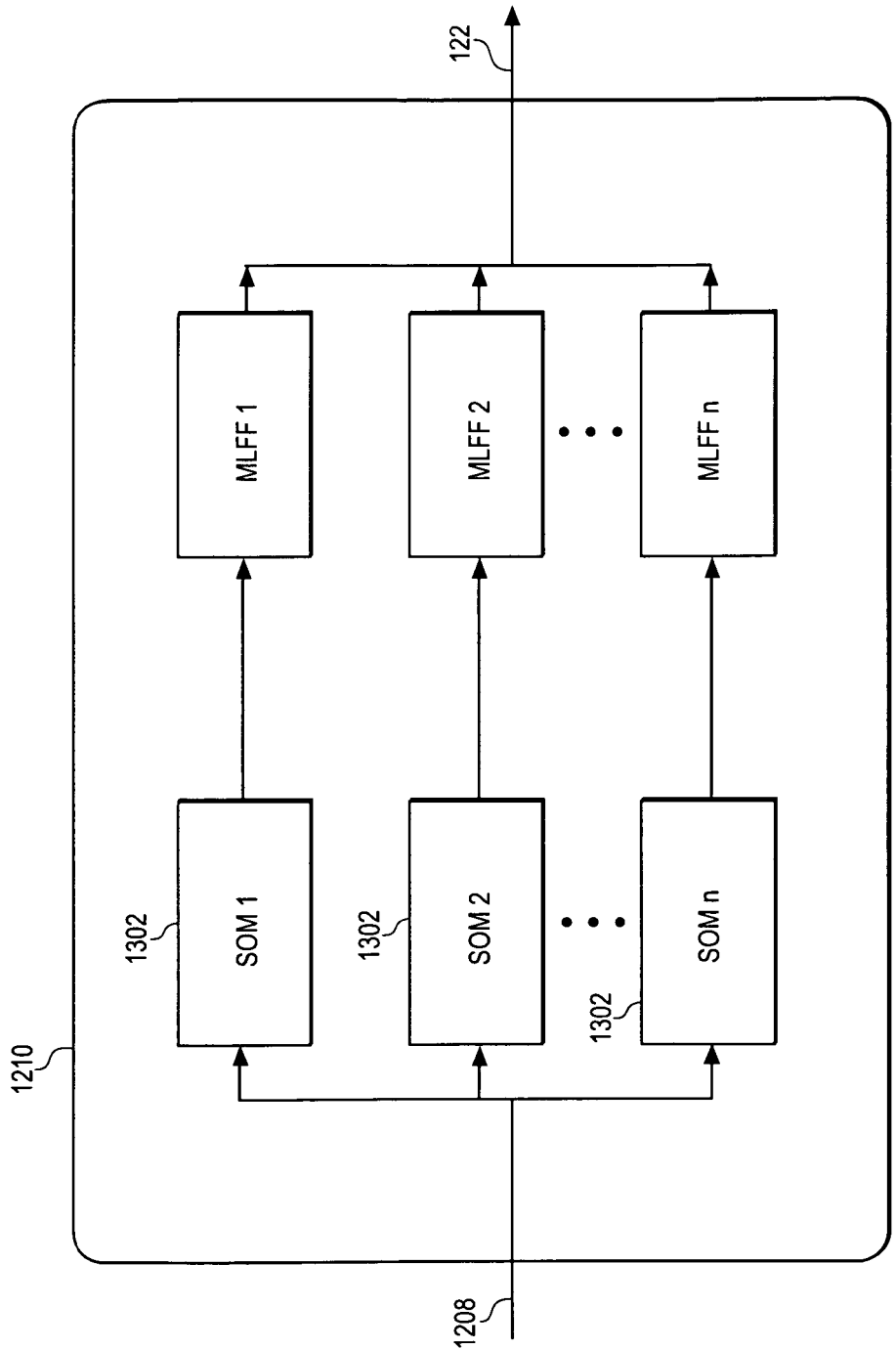
FIG. 13 is the recognition module of FIG. 12 in greater detail according to a preferred exemplary embodiment of the present invention.
Figure 14:
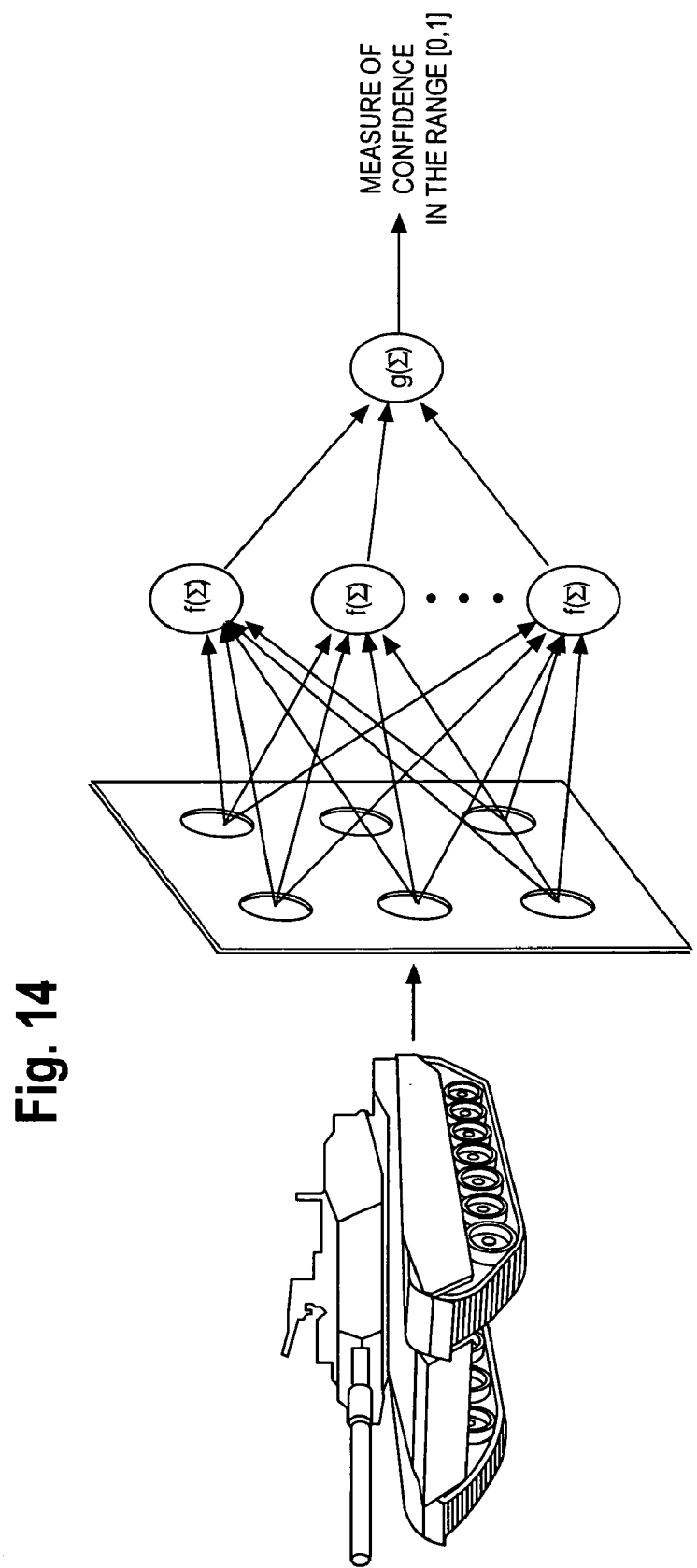
FIG. 14 is an illustration of a neural-network base recognition module that preferably forms the recognition modules of FIG. 13 according to a preferred exemplary embodiment of the present invention.

Referring to FIG. 13, the recognition modules 1210 are shown in greater detail. The recognition modules 1210 are preferably formed of a neural-network based recognition module, and most preferably configured to identify n-object classes with n-recognition modules consisting of a series combination of a self-organizing maps (SOMS) 1302 and multi-layer feed forward networks (MLFFS) 1304 (See illustration of a neural-network based recognition module illustrated in FIG. 14. See also T. Kahonen, *Self-Organizing Maps*, Springer Series in Information Sciences, 1995, and S. Haykin, *Neural Networks, A Comprehensive Foundation*, Prentice Hall, Second Edition, 1999.) With continued reference to FIG. 13, the data formatted output 1208 is provided to the SOMS 1302. Substantially all or each element of the pattern is connected to each node in the SOMS 1302. The SOMS 1302 utilized in accordance with a preferred exemplary embodiment of the present invention consist of fifteen output nodes. The MLFFS 1304 preferably consists of a hidden layer with twenty nodes, each using a tansig non-linearity function ($f(x)$) as follows:

$$f(x) = \frac{2}{\pi}\tan^{-1}(x) \tag{5}$$

However, other network configurations and activation functions can be used in accordance with the present invention. The output layer of each MLFF consists of a single node, which generates a confidence output indicative of a measure of confidence for the object as a member of the object class associated with the node. For example, the classification engine can be configured to generate a measure of confidence in the range of zero to one, with one indicating a high confidence that the pattern of the object belongs to the object class for which the recognition module was trained and zero indicating a low confidence that the pattern belongs to the object class.

The response from each recognition module 1210 is then compared to the response from the remaining recognition modules. The object is then assigned as a member of the object class with greatest measure of confidence over substantially all the recognition modules, and the recognition module 1210 produces classification data 122 that specifies the object class to which the object is a member or specifies the object is not a member of an object class. While the recognition modules 1210 of a preferred embodiment of the present invention are configured to provide parallel processing, the recognition modules 1210 can also be cascaded for discrimination within an object class (i.e., cascaded for recognition of a sub-class of a particular object class).

For example, if a first stage of assembled recognition modules classifies the object as a member of an object class for aircraft, the object is forwarded to a second stage of recognition modules that are configured to recognize various types of airplanes, and the object is further recognized as a member of the object sub-class corresponding to the specific type of airplane. Most preferably, the second stage of recognition modules is only employed when the first stage classifies an object that the second stage is configured to distinguish. Furthermore, additional high-level object criteria or supervisory knowledge can be implemented according to the present invention.

For example, if each pixel has a resolution of one meter and the classification engine has been configured to classify bomber-class aircraft, which have a length greater than thirty meters, the classification engine can be configured to discard objects with pixel lengths that correspond to lengths of less than thirty meters. As can be appreciated, this utilization of additional high-level object criteria or supervisory knowledge is preferably employed in both the object extraction process and in the classification process.

Referring to FIG. 1, once the object recognizer 114 has recognized an object within the input image 108 as a member of an object class, the multiple subbands 120 of the input image 108, and/or the non-decomposed image itself are provided to the multi-rate encoder 116 for compression. The multi-rate encoder 116 varies the compression resolution of the multiple subbands 120 based at least in part upon the recognition of an object as a member of an object class by the object recognizer 114. For example, if the object recognizer 114 provides that an object in the input image 108 is an object that is a member of a relevant object class, the multi-rate encoder 116 is preferably configured to provide a greater compression resolution of a region of the image having the object specified by the coordinate list 514 as compared to the compression resolution for an object that is not a member of the relevant object class or background of the input image 108.

While this detailed description of a preferred exemplary embodiment is illustrated with a single object class (e.g., a relevant object class) and two coding rates providing a first coding resolution or first resolution compression and second coding resolution or second resolution compression, the multi-rate encoder 116 can be configured to provide any number of coding rates that provide any number of coding resolutions for any number of object classes. In addition, while any number of multi-rate encoder configurations can be utilized in accordance with the invention, including the three multi-rate encoder configurations subsequently described as preferred exemplary embodiments.

Figure 15:
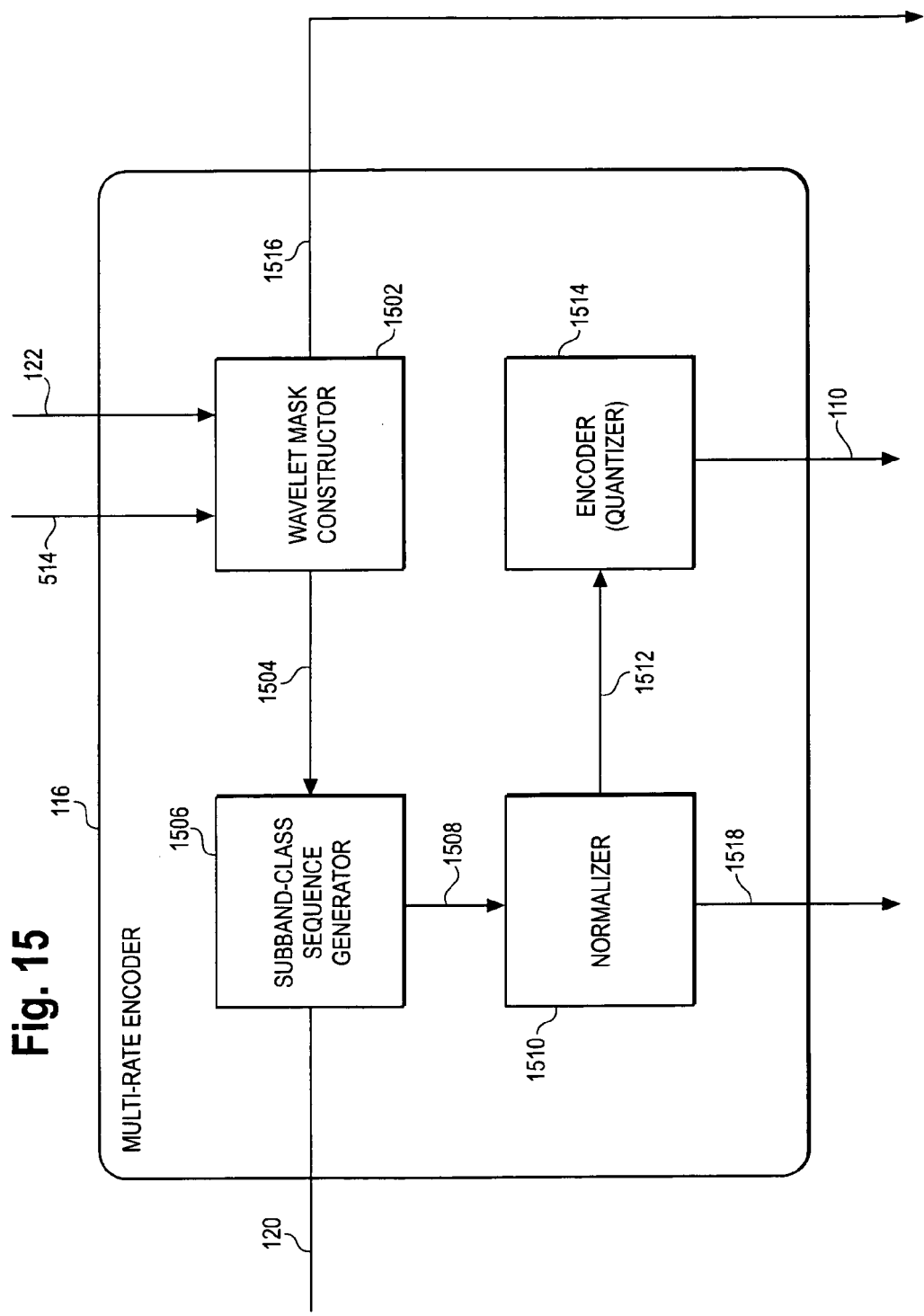
FIG. 15 is the multi-rate encoder of FIG. 1 in greater detail according to a preferred exemplary embodiment of the present invention.

Referring to FIG. 15, the multi-rate encoder 116 is shown in greater detail according to a first exemplary embodiment of the present invention. The multi-rate encoder preferably receives the desired n-level decomposed input image. However, the multi-rate encoder can be configured to perform additional decomposition of the input image prior to multi-rate encoding by the multi-rate encoder if the decomposer 118 is configured to provide less than the desired number of subbands. A wavelet mask constructor 1502 receives the classification data 122 for each object and the corresponding coordinate list 514 specifying regions within the input image 108 that contain objects. As previously stated in this detailed description of a preferred exemplary embodiment, the coordinate list 514 can be formatted to specify a rectangular region within the input image. However, any number of region shapes and formats can be utilized in accordance with the present invention.

The rectangular region is preferably specified with row and column widths within a two-dimensional plane defined by a first axis (e.g., y-axis) and a second axis (e.g., x-axis), and the location and size is preferably provided in units of pixels or blocks of pixels (see Appendix A for an example of a format for the coordinate list 514 specifying regions in an image having an object). In the example format shown in Appendix A, the first two entries in each row provide the location of the upper left corner of the rectangular region with the first axis and second axis coordinates, and the second two entries in each row correspond to the size of the rectangular region.

Figure 16:
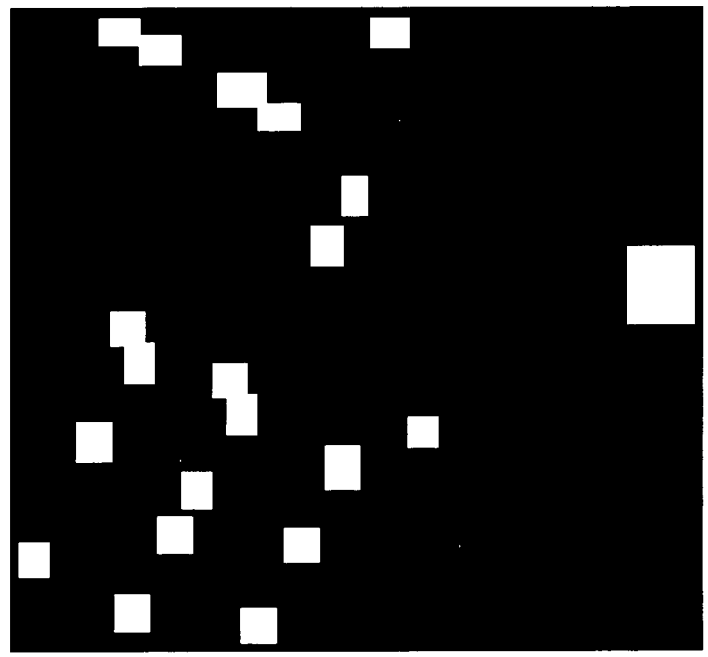
FIG. 16 is an example of a specification mask for an original image used by the wavelet mask constructor of FIG. 15 according to a preferred exemplary embodiment of the present invention.
Figure 17:
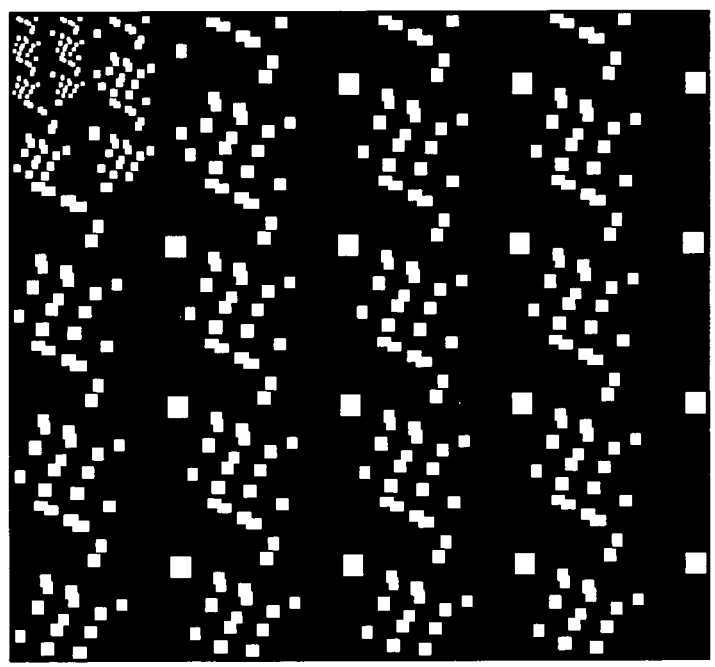
FIG. 17 is an example of a wavelet mask of FIG. 16 generated by the wavelet mask constructor of FIG. 15 according to a preferred exemplary embodiment of the present invention.

Once the region of the image having an object and the associated classification data 122 for the region is provided to the wavelet mask constructor 1502, the wavelet mask constructor 1502 is configured to construct a wavelet mask 1504 that provides a mapping of the a region having an object that is a member of the relevant object class to each of the multiple subbands 120 of the input image (e.g., the rectangle size within each of the multiple subbands is adjusted to correspond to the rectangle size in the input image before decomposition by the decomposer.) For example, FIG. 16 illustrates the specification mask for an original image, and FIG. 17 illustrates the wavelet mask of FIG. 16 generated by the wavelet mask constructor 1502. The rectangular regions of the specification mask of FIG. 16 and corresponding wavelet mask of FIG. 17 correspond to regions having objects recognized as members of the relevant object class that are to be coded at the first coding rate, while the other regions (i.e., regions of the image other than the regions having an object recognized as a member of the relevant object class) of the specification mask (FIG. 16) and the corresponding wavelet mask (FIG. 17) correspond to objects that were not recognized as members of the relevant object class or background of the input image that are to be coded at the second coding rate.

The wavelet mask 1504 generated by the wavelet constructor 1502 is provided to a subband class sequence generator 1506, which also receives the DWT coefficients for each subband of the multiple subbands 120. The subband class sequence generator 1506 is configured to group each subband of the multiple subbands 120 into subband class sequences according to the wavelet mask 1504. For example and for each subband, the subband class sequence generator 1506 is configured to create a first subband class sequence corresponding to regions of the input image that have an object recognized as a member of the relevant object class and a second subband class sequence corresponding to regions of the input image that do not have an object recognized as a member of the relevant object class and/or background of the image. The first and second subband class sequences 1508 are preferably normalized before quantization by the encoder 1514.

More specifically, the first and second subband-class sequences 1508 generated by the subband-class sequence generator 1506 are preferably normalized with a statistics normalizer 1510. This normalization by the statistics normalizer 1510 can be conducted with any number of normalization techniques. For example, the statistics normalizer 1510 can be configured to calculate a mean and standard deviation of each subband-class sequence, and subtract and divide each mean and standard deviation, respectively, for normalization.

Once the first and second normalized subband class sequences 1512 are generated by the normalizer 1510, the encoder 1514 is provided with the first and second normalized subband class sequences 1512, which encodes a first subband class sequence at a first coding rate and a second subband class sequence at a second coding rate using any form of quantization to produce the compressed image 110 (e.g., scalar quantization, vector quantization, trellis-coded quantization, etc.). The compressed image 110 provides a compressed representation of the image with a region or regions of the image that have an object recognized as a member of the relevant object class having a first coding resolution that is greater than a second coding resolution provided for objects that are not recognized as a member of the relevant object class and/or background of the image.

The quantity of side information 1516 for this embodiment of the multi-rate encoder 116 is relatively low. For proper target placement, a decoder utilizes the target location and size as provided by the coordinate list 514. Typically, for each object recognized as a member of the relevant object class, sixteen to thirty-two bits (e.g., eight to sixteen bits for row location and eight to sixteen bits for column location) would be used for designating the location of an object recognized as a member of the relevant object class, and eight to sixteen bits (e.g., four to eight bits for row width and four to eight bits for column width) would be used for designating the size of the object recognized as a member of the relevant object class. Generally, the statistics 1518 of the first and second subband-class sequences are also preferably transmitted to the decoder, and are typically allocated eight to sixteen bits for each mean and variance of the subband-class sequence. In the preferred embodiment, uniform scalar quantization is used to code the side information 1516 and statistics 1518.

The preferred embodiment of the decoder for the first exemplary embodiment of the multi-rate encoder receives the wavelet coefficients, the target locations and sizes, and side information (statistics, background bit rate, targets bit rate). The wavelet mask is formed using the techniques implemented by the multi-rate encoder. The wavelet coefficients are reconstructed, renormalized, and decoded according to the reconstructed wavelet mask (i.e., using the wavelet mask, the decoder is configured to determine the correspondence between the transmitted coefficients and the objects recognized as members of the relevant object class objects not recognized as members of the relevant object class and/or the background of the image. The coefficients are inverse wavelet transformed, and the reconstructed image is formed, with the objects recognized as members of the relevant object class having a higher fidelity as compared to the objects not recognized as members of the relevant object class and/or the background of the image.

The second exemplary embodiment of multi-rate encoder 116 preferably has the same or similar configuration as the first exemplary embodiment of the multi-rate encoder 116 shown in FIG. 15. However, the second exemplary embodiment of the multi-rate encoder utilizes an outer contour region of each object recognized as a member of the relevant object class. This outer contour region substantially resembles the outer outline of a relevant object class member, and coding at the first coding rate is preferably limited to the region inside the outer contour region.

Figure 18:
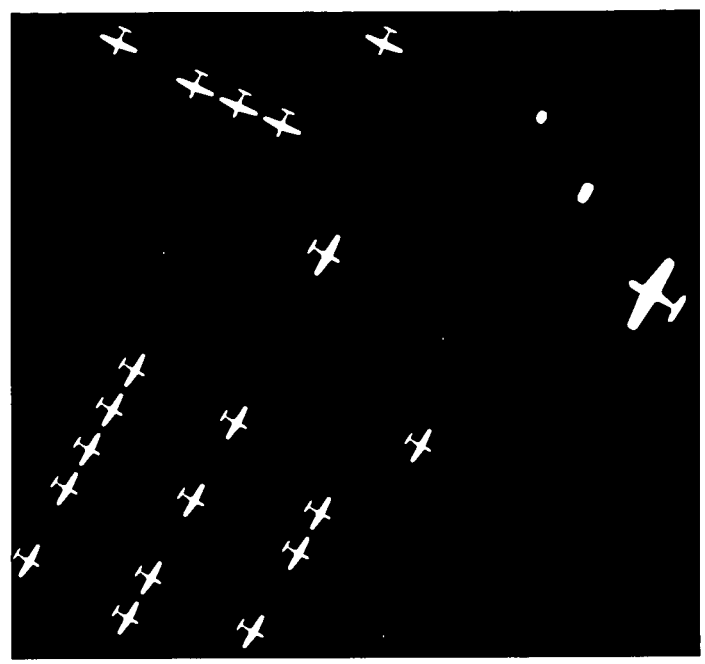
FIG. 18 is another example of a specification mask for an original image used by the wavelet mask constructor of FIG. 15 according to a preferred exemplary embodiment of the present invention.
Figure 19:
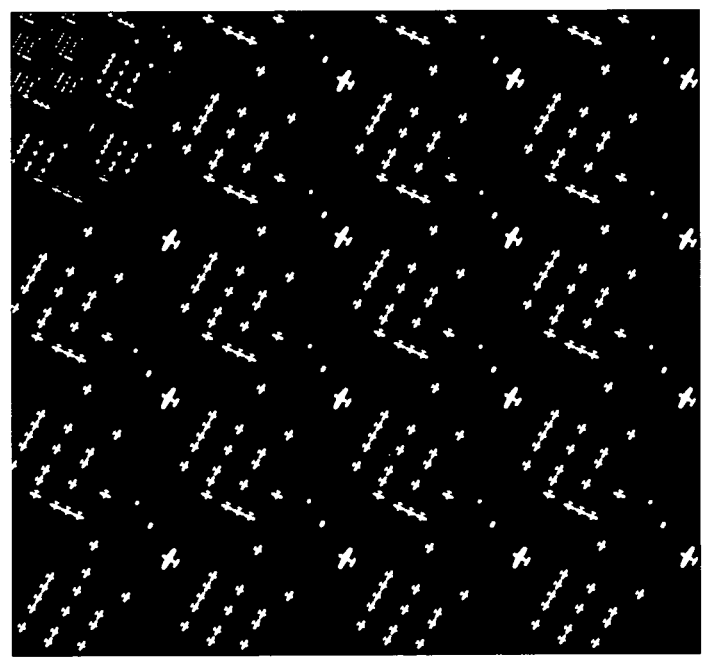
FIG. 19 is an example of a wavelet mask of FIG. 18 generated by the wavelet mask constructor of FIG. 15 according to a preferred exemplary embodiment of the present invention.

Referring to FIGS. 18 and 19, FIG. 18 shows the target specification mask for the original image and FIG. 19 shows the corresponding wavelet mask for the target specification mask of FIG. 18 as produced by the wavelet mask constructor of the second exemplary embodiment of the multi-rate encoder. The contour regions of the specification mask of FIG. 18 and the wavelet mask of FIG. 19 correspond to contour regions having objects recognized as members of the relevant object class that are to be coded at the first coding rate, while the other regions (i.e., regions of the image other than the regions having an object recognized as a member of the relevant object class) are coded at the second coding rate. The regions having an object recognized as a member of the relevant object class are therefore coded independently from the other objects that were not recognized as a member of the relevant object class and background of the image, with a greater bit rate used for the contour regions having an object recognized as a member of the relevant object class. The wavelet mask of FIG. 19 is provided to the subband class sequence generator, which classifies the wavelet coefficients in each of the multiple subbands into either the first subband class and second subband class for subsequent normalization and quantization by the normalizer 1510 and encoder 1512, respectively, as previously discussed with reference to FIG. 15.

The decoder for the second exemplary embodiment of the multi-rate encoder receives the wavelet coefficients, contour information, and side information (statistics, background bit rate, targets bit rate). The wavelet coefficients are reconstructed, renormalized, and decoded according to the reconstructed wavelet mask. The coefficients are inverse wavelet transformed and the reconstructed image is formed with the objects recognized as members of the relevant object class having a higher fidelity as compared to the objects not recognized as members of the relevant object class and/or the background of the image.

The third exemplary embodiment of the multi-rate encoder has the same or similar configuration as the first and second exemplary embodiments of the multi-rate encoder and the third exemplary embodiment is configured to construct a Region-of-Interest (ROI) estimate and subtract the ROI estimate from the actual region having the object recognized as a member of the relevant object class to form a difference ROI, which is coded at the first coding rate. In order to form a difference ROI, each region having an object recognized as a member of the relevant object class is assigned a template that corresponds to the assumed shape of the object that is provided by the classification data.

Figure 20:
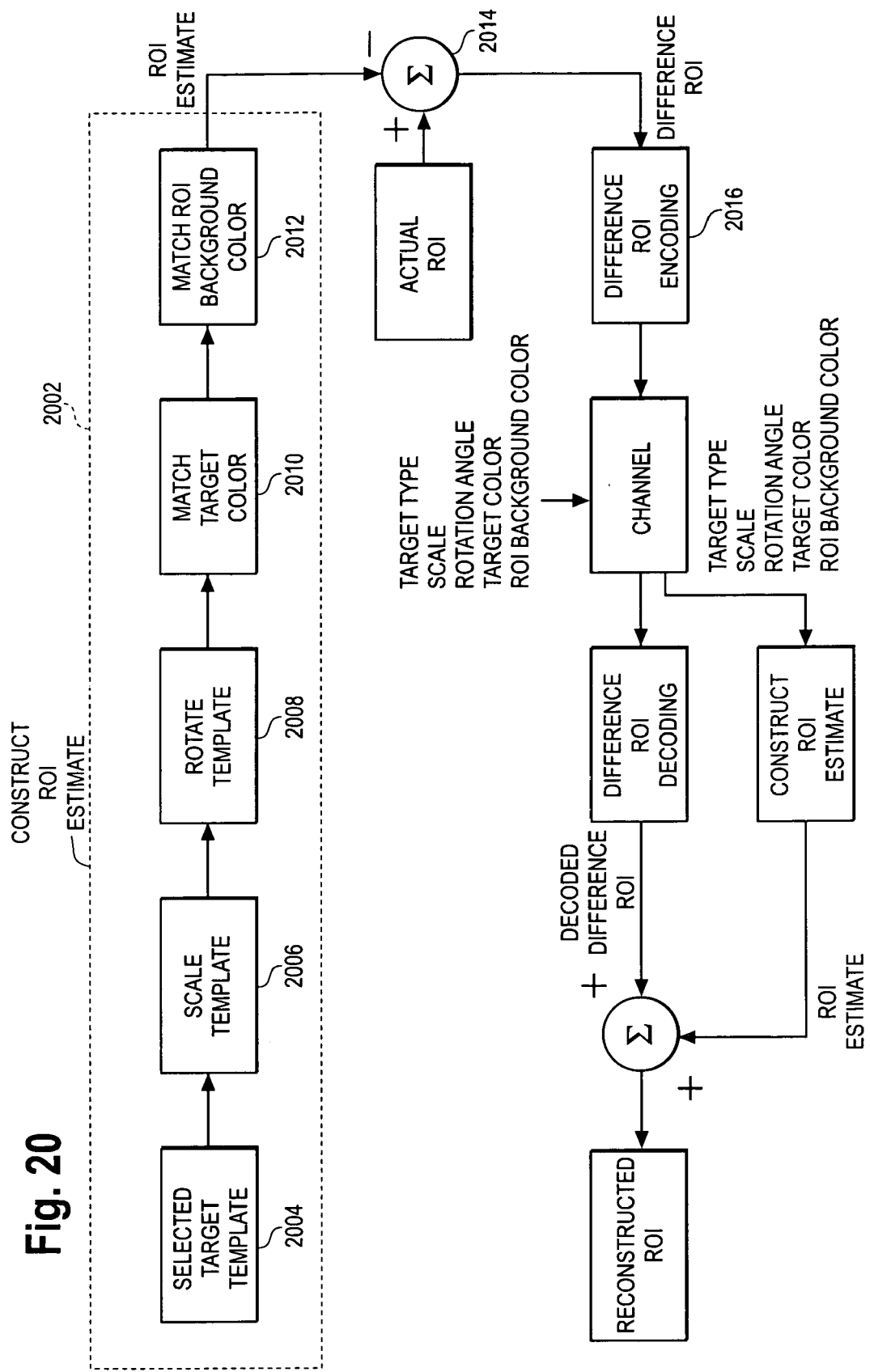
FIG. 20 is a flow diagram for the third preferred exemplary embodiment of the multi-rate encoder.

Referring to FIG. 20, which is a flow diagram of the third preferred exemplary embodiment of multi-rate encoder, the ROI estimate is constructed 2002 with the selection of a template 2004 that is first scaled in size to match the size of the object in the actual ROI 2006. The selected template is then rotated to match the rotation of the object in the actual ROI 2008. The average color or gray level of the selected template is then substantially matched to the actual object 2010. Finally, either using a rectangular or contour based ROI boundary, the average color or gray level of the ROI background (i.e., the region inside the ROI boundary, but outside the actual region of the object) is matched to the background of the actual ROI 2012. Once the ROI estimate is constructed 2002, the estimated ROI is subtracted from the actual ROI to form the difference ROI 2014. This difference ROI has much lower energy than the actual ROI, and can be coded 2016 with a lower bit rate than the actual ROI. If the multiple subbands 120 contain only the original image (i.e. a zero-order decomposition), then the original image containing the difference ROI is wavelet decomposed prior subclass class sequence generation. Otherwise, a duplicate of the original image is created, with the estimated ROI replacing the actual ROI. A wavelet decomposition is subsequently performed, so that ROI subtraction is performed on a subband-by-subband basis.

The decoder corresponding to the third exemplary embodiment of the multi-rate encoder performs the reverse process whereby the encoded difference ROI is first decoded to obtain a decoded difference ROI 2018. The appropriate ROI estimate is then reconstructed in same or similar manner performed by the encoder 2020. The decoded difference ROI and the constructed ROI estimate are then summed to form the reconstructed ROI 2022.

As can be appreciated, the decoder utilizes the target type, target scale, rotation angle, target color, and ROI background color for ROI estimate reconstruction, and this information is preferably transmitted by the encoder to the decoder as side information. Preferably, eight bits are used for the target type. Nine bits are preferably used for the target scale and target rotation angle and eight bits are used for the target average gray level even though additional bits can be used if more than one color component is specified in the particular application.

From the foregoing description, it should be appreciated that the present invention provides methods and apparatus for distinguishing between a region for which fidelity is preferably maintained and a region for which fidelity is less important, such that a video image is compressed with reduced transmission requirements (e.g., bandwidth and/or storage requirements) while preserving the target-specific utility of the video image. Furthermore, it should be appreciated that a vast number of variations in the embodiments exist and these embodiments are preferred exemplary embodiments only, which are not intended to limit the scope, applicability, or configuration of the invention in any way. Rather, the foregoing detailed description is intended to provide those skilled in the art with a convenient road map for implementing a preferred exemplary embodiment of the invention. It being understood that various changes may be made in the function and arrangement of elements described in the exemplary preferred embodiment without departing from the spirit and scope of the invention as set forth in the appended claims.

APPENDIX A region for object 1: left top pixel row, left top pixel column, number of rows, and number of columns
region for object 2: left top pixel row, left top pixel column, number of rows, and number of columns
region for object 3: . . .

What is claimed is:

1. A method of recognizing and compressing an image for transmission such that a requirement for transmission of the image is reduced while maintaining target-specific utility of said image, comprising:
   defining a first object class having a first object criteria that is at least partially related to the target-specific utility of said image;
   recognizing an object within said image as a member of said first object class if said object substantially meets said first object criteria of said first object class;
   decomposing said image into a plurality of subbands;
   providing to each of said multiple subbands a mapping of the region of said image having said object recognized as a member of said first object class;
   creating for each of said multiple subbands a first subband class sequence corresponding to said region of said image having said object recognized as a member of said first object class and a second subband class corresponding to regions of said image not having said object recognized as a member of said first object class;
   normalizing said first and said second subband class sequences; and
   encoding said normalized first subband class sequences at a first coding rate and encoding said normalized second subband class sequences at a second coding rate, wherein said first coding rate is higher than said second coding rate.

2. The method of claim 1, further comprising synthesizing an object contour of said object within the image.

3. The method of claim 1, further comprising synthesizing a rotated binary image chip of said object within the image.

4. The method of claim 1, further comprising synthesizing a symmetrically rotated binary image chip of said object within the image.

5. The method of claim 2, wherein synthesizing said object contour of said object within the image comprises:
   producing a binary image of the image; and
   extracting an outer edge of the binary image.

6. The method of claim 2, wherein synthesizing said object contour of said object within the image comprises:
   producing an edge image of the image; and
   extracting an outer edge of the edge image.

7. The method of claim 5, further comprising:
   generating a coordinate list of said outer edge of said binary image, said coordinate list specifying a bounding region enclosing said object within the image;
   extracting an image chip from the image corresponding to said bounding region specified by said coordinate list;
   generating a binary image chip of said image chip; and
   conforming said binary image chip to a symmetrical axis to product said object contour.

8. The method of claim 6, further comprising:
   generating a coordinate list with said outer edge of said edge image, said coordinate list specifying a bounding region enclosing said object within said image;
   extracting an image chip from the image corresponding to said bounding region specified by said coordinate list;
   generating a binary image chip of said image chip; and
   conforming said binary image chip to a symmetrical axis to produce said object contour.

9. The method of claim 7, wherein generating said coordinate list of said outer edge includes:
   comparing the dimension of said bounding region to predetermined validation dimension; and
   validating said object if the dimension of said bounding region is less than said predetermined validation dimension.

10. The method of claim 8, wherein generating a coordinate list of said outer edge includes:
    comparing the dimensions of said bounding region to predetermined validation dimensions; and
    validating said object if the dimensions of said bounding region is less than said predetermined validation dimensions.

11. The method of claim 7, wherein said symmetrical axis is a vertically symmetrical axis.

12. The method of claim 8, wherein said symmetrical axis is a vertically symmetrical axis.

13. The method of claim 1, wherein recognizing said object within the image further comprises recognizing said object within the image as a member of a first object sub-class of said first object class if said object substantially meets said first object criteria of said first object class and said first sub-class object criteria of said first object sub-class.

14. An apparatus for recognizing and compressing an image such that a requirement for the transmission of said image is reduced while maintaining target-specific utility of said image, comprising:
    an object processor configured to receive the image and synthesize an object existing within said image;
    a classification engine configured to recognize said object existing within said image as a member of a first object class if said object substantially meets first object criteria of said first object class that is at least partially related to the target-specific utility of said image;
    an image decomposer configured to decompose said image into a plurality of subbands;
    a wavelet mask constructor configured to provide for each of said multiple subbands a mapping of the region of said image having said object;
    a subband class sequence generator configured to create for each of said multiple subbands a first subband class sequence corresponding to said region of said image having said object recognized as a member of said first object class and a second subband class corresponding to regions of said image not having said object recognized as a member of said first object class;
    a normalizer configured to normalize said first and said second subband class sequences; and
    a multi-rate encoder configured to encode said normalized first subband class sequences at a first coding rate and to encode said normalized second subband class sequences at a second coding rate, wherein said first coding rate is higher than said second coding rate.

15. The apparatus of claim 14, wherein said object is synthesized to form a rotated binary image chip of said object existing within the image.

16. The apparatus of claim 14, wherein said object is synthesized to form a symmetrically rotated binary image chip of said object existing within the image.

17. The apparatus of claim 14, wherein said object processor comprises:
a binary image generator configured to receive the image and produce a binary image of said object; and
an outer edge extractor configured to extract an outer edge of the binary image and generate a coordinate list with said outer edge that specifies a bounding region enclosing said object existing within the image.

18. The apparatus of claim 14, wherein said object processor comprises:
an edge image generator configured to receive the image and produce an edge image of said object; and
an outer edge extractor configured to extract an outer edge of the edge image and generate a coordinate list with said outer edge that specifies a bounding region enclosing said object existing within the image.

19. The apparatus of claim 17, further comprising:
an object extractor configured to extract an image chip from the image corresponding to said bounding region specified by said coordinate list;
a binary chip image generator configured to generate a binary image chip of said image chip; and
a symmetrical rotator configured to conform said binary image chip to a symmetrical axis to produce said object.

20. The apparatus of claim 18, further comprising:
an object extractor configured to extract an image chip from the image corresponding to said bounding region specified by said coordinate list;
a binary chip image generator configured to generate a binary image chip of said image chip; and
a symmetrical rotator configured to conform to said binary image chip to a symmetrical axis to produce said object.

21. The apparatus of claim 1 wherein the size of said region having said object recognized as a member of said first object class in said mapping of said region having said object recognized as a member of said first object class within each of said multiple subbands is adjusted to correspond to the size in said image of said object recognized as a member of said first object class.

22. The apparatus of claim 14 wherein said wavelet mask constructor adjusts the size of said region having said object recognized as a member of said first object class in said mapping of said region having said object recognized as a member of said first object class within each of said multiple subbands is adjusted to correspond to the size in said image of said object recognized as a member of said first object class.

* * * * *